United States Patent
Mulcahy et al.

(10) Patent No.: US 10,358,600 B2
(45) Date of Patent: Jul. 23, 2019

(54) POLYMERISABLE LIQUID CRYSTAL MATERIAL AND POLYMERISED LIQUID CRYSTAL FILM

(71) Applicant: Merck Patent GmbH, Darmstadt (DE)

(72) Inventors: Stephen Mulcahy, Southampton (GB); Iain Gardiner, Chandlers Ford (GB); Jack Bradford, Southampton (GB); Eduardo Beltran Gracia, Southampton (GB); Graham Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 42 days.

(21) Appl. No.: 15/596,137

(22) Filed: May 16, 2017

(65) Prior Publication Data

US 2017/0335192 A1 Nov. 23, 2017

(30) Foreign Application Priority Data

May 17, 2016 (EP) ..................... 16169931

(51) Int. Cl.
| | |
|---|---|
| *G02F 1/1333* | (2006.01) |
| *C09K 19/38* | (2006.01) |
| *C08F 220/30* | (2006.01) |
| *C08J 5/18* | (2006.01) |
| *C08F 238/00* | (2006.01) |
| *C09K 19/52* | (2006.01) |
| *C09K 19/04* | (2006.01) |

(52) U.S. Cl.
CPC ........ *C09K 19/3852* (2013.01); *C08F 220/30* (2013.01); *C08F 238/00* (2013.01); *C08J 5/18* (2013.01); *C09K 19/52* (2013.01); *C08F 2220/303* (2013.01); *C08J 2333/14* (2013.01); *C08J 2349/00* (2013.01); *C09K 2019/0448* (2013.01)

(58) Field of Classification Search
CPC .............. C09K 19/3852; C09K 19/52; C09K 2019/0448; G02F 1/1333; C08J 5/18; C08J 2333/14; C08J 2349/00; C08F 220/30; C08F 238/00; C08F 2220/303
USPC ................................... 252/299.67
See application file for complete search history.

(56) References Cited

U.S. PATENT DOCUMENTS

| | | | |
|---|---|---|---|
| 8,333,906 B2 * | 12/2012 | Schott .................... | C09K 19/38 252/299.01 |
| 8,992,796 B2 | 3/2015 | Hasebe et al. | |
| 9,703,145 B2 | 7/2017 | Ryu et al. | |
| 2012/0056129 A1 | 3/2012 | Hasebe et al. | |
| 2015/0301386 A1 | 10/2015 | Ryu et al. | |

FOREIGN PATENT DOCUMENTS

| | | |
|---|---|---|
| EP | 2399942 A1 | 12/2011 |
| EP | 2927301 A1 | 10/2015 |
| JP | 5054456 B2 | 10/2012 |

OTHER PUBLICATIONS

J. Xu et al., "Synthesis and Photopolymerization Kinetics of Oxime Ester Photoinitiators", Journal of Applied Polymer Science, vol. 123 (2012) pp. 725-731.
English Machine Translation of JP 5054456 B2 published Oct. 24, 2012.
European Search Report dated Oct. 6, 2017 issued in corresponding EP 17170960 application (6 pages).

* cited by examiner

*Primary Examiner* — Geraldina Visconti
(74) *Attorney, Agent, or Firm* — Millen White Zelano and Branigan, PC; John Sopp

(57) ABSTRACT

A polymerizable LC material comprising at least one di- or multireactive mesogenic compound selected from the group of compounds of formula I,

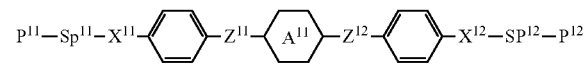

at least one monoreactive mesogenic compound selected from the group of compounds of formula II,

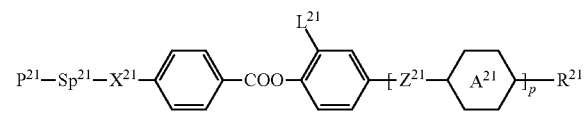

wherein the parameter $A^{11}$ to $A^{21}$, $L^{21}$, p, $P^{11}$ to $P^{22}$, $R^{21}$, $Sp^{11}$ to $Sp^{21}$, $X^{11}$ to $X^{21}$, and $Z^{11}$ to $Z^{21}$ have one of the meanings as given in claim 1, and at least one carbazole oxime ester photoinitiator. Furthermore, a method for preparation of the polymerizable LC material, a polymer film with improved thermal durability obtainable from the corresponding polymerizable LC material, a method of preparation of such polymer film, and the use of such polymer film and said polymerizable LC material for optical, electro-optical, decorative or security devices.

23 Claims, No Drawings

POLYMERISABLE LIQUID CRYSTAL MATERIAL AND POLYMERISED LIQUID CRYSTAL FILM

FIELD OF INVENTION

The invention relates to a polymerisable LC material comprising at least one di- or multireactive mesogenic compound selected from the group of compounds of formula I,

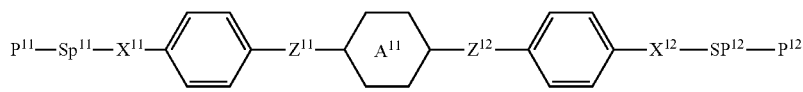

at least one monoreactive mesogenic compound selected from the group of compounds of formula II,

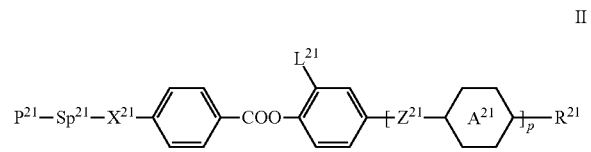

wherein the parameter $A^{11}$ to $A^{21}$, $L^{21}$, p, $P^{11}$ to $P^{22}$, $R^{21}$, $Sp^{11}$ to $Sp^{21}$, $X^{11}$ to $X^{21}$, and $Z^{11}$ to $Z^{21}$ have one of the meanings as given below, and at least one carbazole oxime ester photoinitiator.

Furthermore, the present invention relates to a method for preparation of the LC material, to a polymer film with improved thermal durability obtainable from the corresponding polymerisable LC material, to a method of preparation of such polymer film, and to the use of such polymer film and said polymerisable LC material for optical, electro-optical, decorative or security devices.

BACKGROUND

Polymerizable liquid crystal materials are known for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular or perpendicular to the layer) or tilted.

Such optical films are described, for example, in EP 0 940 707 B1, EP 0 888 565 B1 and GB 2 329 393 B1.

Polymerisable liquid crystal (LC) materials, while stable at room temperature, can degrade when subjected to increased temperatures. For example, when heated for a period of time the optical properties such as dispersion or retardance decreases and as such, the performance of the optical film degrades over time. This can be attributed, in particular, to a low degree of polymerisation and a corresponding high content of residual free radicals in the polymer, polymer shrinkage, and/or thermo-oxidative degradation.

A high degree of polymerisation can be, i.a., influenced by the choice of the utilized photoinitiator. In this regard, Nie et al. describe in JOURNAL OF APPLIED POLYMER SCIENCE, 123, 2, 2012, 725-731; the synthesis and photopolymerisation kinetics of suitable oxime ester photoinitiators. In addition to this, JP 5054456 B2 describes polymerisable liquid crystal (LC) materials comprising one or more direactive mesogenic compounds and the commercially available photoinitiators Oxe02 available from by Ciba and N-1919 (T) available from Adeka. However, polymerisable liquid crystal (LC) materials comprising one or more direactive mesogenic compounds and one or monoreactive mesogenic compounds are not disclosed.

In particular, the desired properties of an optical retardation film, like, e.g., uniform alignment of the mesogenic compounds, film structure, film adhesion, temperature stability and optical performance, are highly dependent from the composition of the polymerisable liquid crystal material especially concerning the ratio and choice of mono- and direactive mesogenic compounds.

For example, polymer shrinkage, which is a decrease in thickness of the optical film, reduces the retardance of the passing light in accordance to $R=d\Delta n$, wherein R is the retardance, d is the thickness of the birefringent film, $\Delta n$ is the birefringence.

As commonly known, the polymer shrinkage can be reduced by utilizing polymerisable compounds having more than one polymerizable group, e.g. di- or multireactive compounds, and therefore capable of forming a more cross-linked and more rigid polymer. However, again, the desired properties of an optical retardation film are highly dependent from the composition of the polymerisable liquid crystal material. In this regard, one possible way to adjust the alignment profile in the direction perpendicular to the film plane is the appropriate selection of the ratio of monoreactive mesogenic compounds, i.e., compounds with one polymerizable group, and direactive mesogenic compounds, i.e. compounds with two polymerizable groups. In addition, low diacrylate content RM films are highly suitable for applications where good adhesion of the RM film to the substrate is important. However, as stated above, in low diacrylate content RM films often the optical retardation drops significantly especially due to polymer shrinkage.

Thermo-oxidative degradation is the breakdown of a polymer network catalysed by oxidation at high temperatures. As commonly known, antioxidant additives, or short antioxidants, can be used to reduce the thermo-oxidative degradation of polymers when subjected to increased temperatures. This is especially important when optical films are utilized for an in-cell application due to the high temperatures. In particular, the optical film has to endure when annealing the polyimide layer in the LC cell. In this regard, the documents WO 2009/86911 A1 and JP 5354238 B1 describe polymerisable liquid crystal (LC) materials comprising the commercially available antioxidant Irganox® 1076.

All of the above-described materials have distinct disadvantages, such as, the thermal durability of the resulting polymer films is still not high enough, their transparency to VIS-light is limited, they require the utilization of further additives, or their application bandwidth is limited, due to the utilized LC material.

SUMMARY OF THE INVENTION

Therefore, there is still the need for new and preferably improved, polymerisable liquid crystal materials or mixtures, which do not exhibit the drawbacks of prior art materials or if so, do only exhibit them to a lesser extent.

Advantageously, such polymerisable LC material, should preferably be applicable for the preparation of different, uniform aligned polymer films, and should, in particular at the same time,

- show a favourable adhesion to a substrate,
- be highly transparent to VIS-light,
- exhibit an reduced yellow colouration over time (yellowing) and
- show a favourable high temperature stability or durability, and in addition,
- the uniform aligned polymer films should be produced by compatible, commonly known methods for the mass production.

Other aims of the present invention are immediately evident to the person skilled in the art from the following detailed description.

Surprisingly, the inventors of the present invention have found that one or more, preferably all of the above requirements aims can be achieved, preferably at the same time, by using a polymerisable LC material as described herein.

Thus, the invention relates to a polymerisable LC material comprising:

at least one di- or multireactive mesogenic compound selected from the group of compounds of formula I,

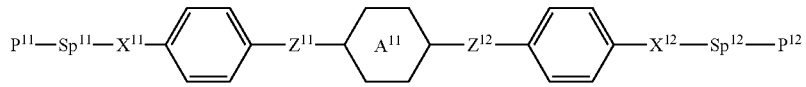

I wherein
$A^{11}$ denotes

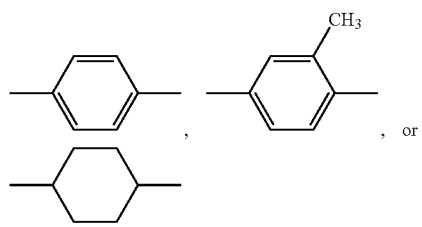

preferably

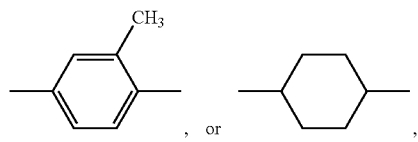

$P^{11}$ and $P^{12}$ each denote, independently from one another, a polymerisable group,
$Sp^{11}$ and $Sp^{12}$ each denote, independently from one another, a spacer group or a single bond, preferably both are a spacer group,
$X^{11}$ and $X^{12}$ each denote, independently from one another, —O—, —S—, —CO—, —COO—, —OCO—, —OCOO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{xx}$—, —CY$^{xx}$=CY$^{yy}$—, —C≡C—, —CH=CH—COO—, —OCO—CH=CH— or a single bond,
$R^{xx}$ and $R^{yy}$ each, independently of one another, denote H or alkyl having 1 to 12 C atoms,
$Y^{xx}$ and $Y^{yy}$ each, independently of one another, denote H, F, Cl or CN, and
$Z^{11}$ and $Z^{12}$ each denote, independently from one another, —COO—, —OOC—, —OCOO—, —OOCO—, or a single bond, preferably —COO— or —OOC—;

at least one monoreactive mesogenic compound selected from the group of compounds of formula II,

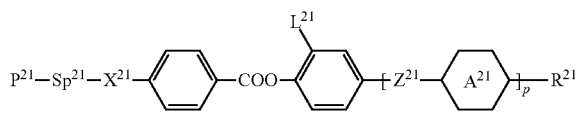

II wherein
$A^{21}$ denotes

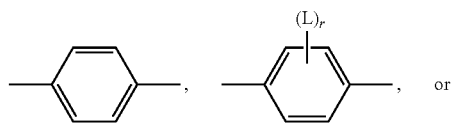

-continued

preferably

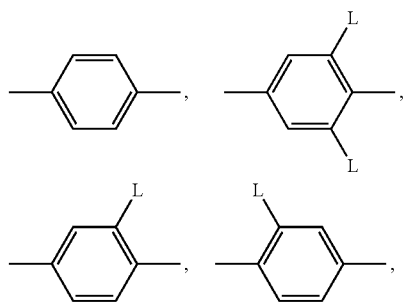

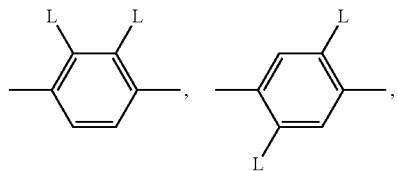

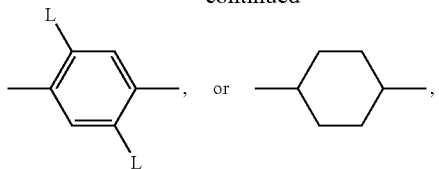

more preferably

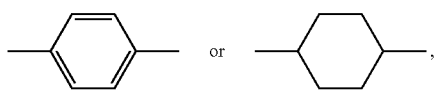

r is in each occurrence independently from another an integer from 1 to 4, preferably, 1 or 2, L denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or, preferably F, Cl, CN, $CH_3$, $C_2H_5$, $OCH_3$, $COCH_3$, $OCF_3$, more preferably F, Cl, $CH_3$, $OCH_3$, $COCH_3$ or $OCF_3$, $L^{21}$ denotes H, F, Cl, CN, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, preferably H, F, Cl, $CH_3$, $OCH_3$, p denotes 0, 1 or 2, preferably 0 or 1, $P^{21}$ denotes a polymerisable group, $R^{21}$ is H, alkyl, alkoxy, thioalkyl, alkylcarbonyl, alkoxycarbonyl, alkylcarbonyloxy or alkoxycarbonyloxy with 1 to 10 C atoms or more, preferably 1 to 5 C atoms, or is Y.

Y is F, Cl, CN, $NO_2$, OCN, SCN, or mono- oligo- or polyfluorinated alkyl or alkoxy with 1 to 4 C atoms, preferably F, Cl, CN, $NO_2$, $OCH_3$, or mono- oligo- or polyfluorinated alkyl or alkoxy with 1 to 4 C atoms.

$Sp^{21}$ denotes a spacer group or a single bond, preferably a spacer group, $X^{21}$ denotes —O—, —S—, —CO—, —COO—, —OCO—, —O—COO—, —CO—$NR^{xx}$—, —$NR^{xx}$—CO—, —$NR^{xx}$—CO—$NR^{yy}$—, —OCH2-, —$CH_2$O—, —$SCH_2$—, —$CH_2$S—, —$CF_2$O—, —$OCF_2$—, —$CF_2$S—, —$SCF_2$—, —$CF_2CH_2$—, —$CH_2CF_2$—, —$CF_2CF_2$—, —CH=N—, —N=CH—, —N=N—, —CH=$CR^{xx}$—, —$CY^{xx}$=$CY^{yy}$—, —C≡C—, —CH=CH—COO—, —OCO—CH=CH— or a single bond, preferably —O—, —S—, —CO—, —COO—, —OCO—, —O—COO—, or a single bond, more preferably —O—, or a single bond, $R^{xx}$ and $R^{yy}$ each, independently of one another, denote H or alkyl having 1 to 12 C atoms, $Y^{xx}$ and $Y^{yy}$ each, independently of one another, denote H, F, Cl or CN, and $Z^{21}$ denotes —C≡C—, —COO—, —OOC—, —OCOOO—, —OOCO—, or a single bond, preferably —C≡C—, —COO—, —OOC—, or a single bond;

and at least one carbazole oxime ester photoinitiator.

Further, the invention relates to a corresponding method of production of the polymerisable LC material comprising the step of mixing at least one di- or multireactive mesogenic compound of formula I and at least one monoreactive mesogenic compound of formula II, with at least one carbazole oxime ester photoinitiator.

The invention further relates to a polymer film obtainable, preferably obtained, from the polymerisable LC material, as described above and below and to a method of production of a polymer film, as described above and below.

The invention further relates to a method of increasing the durability of a polymer film, obtainable, preferably obtained, from a polymerisable LC material as described above and below, by adding a carbazole oxime ester photoinitiator to at least one di- or multireactive mesogenic compound of formula I and at least one monoreactive mesogenic compound of formula II, before polymerisation, and then polymerizing the mixture.

The invention further relates to the use of a polymer film or polymerisable LC material, as described above and below, in optical, electro-optical, information storage, decorative and security applications, like liquid crystal displays, projection systems, polarisers, compensators, alignment layers, circular polarisers, colour filters, decorative images, liquid crystal pigments, reflective films with spatially varying reflection colours, multicolour images, non-forgeable documents like identity or credit cards or banknotes, or windows.

The invention further relates to an optical component or device, polariser, patterned retarder, compensator, alignment layer, circular polariser, colour filter, decorative image, liquid crystal lens, liquid crystal pigment, reflective film with spatially varying reflection colours, multicolour image for decorative or information storage, comprising at least one a polymer film or the polymerisable LC material, as described above and below.

The invention further relates to a liquid crystal display comprising at least one polymer film or the polymerisable LC material or an optical component, as described above and below.

The invention further relates to authentification, verification or security marking, coloured or multicolour image for security use, non-forgeable object or document of value, like an identity or credit card or a banknote, comprising at least one polymer film or polymerisable LC material or a optical component as described above and below.

Terms and Definitions

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "(meth)acrylic polymer" as used in the present invention includes a polymer obtained from acrylic monomers, a polymer obtainable from methacrylic monomers, and a corresponding co-polymer obtainable from mixtures of such monomers.

The term "polymerisation" means the chemical process to form a polymer by bonding together multiple polymerisable groups or polymer precursors (polymerisable compounds) containing such polymerisable groups.

The terms "film" and "layer" include rigid or flexible, self-supporting or freestanding films with mechanical stability, as well as coatings or layers on a supporting substrate or between two substrates.

A "polymer network" is a network in which all or a large number of polymer chains are interconnected to form a single macroscopic entity by many crosslinks. The polymer network can occur in the following types:

A graft polymer molecule is a branched polymer molecule in which one or more the side chains are different, structurally or configurationally, from the main chain.

A star polymer molecule is a branched polymer molecule in which a single branch point gives rise to multiple linear chains or arms. If the arms are identical, the star polymer molecule is said to be regular. If adjacent arms are composed of different repeating subunits, the star polymer molecule is said to be variegated.

A comb polymer molecule consists of a main chain with two or more three-way branch points and linear side chains. If the arms are identical, the comb polymer molecule is said to be regular.

A brush polymer molecule consists of a main chain with linear, unbranched side chains and where one or more of the branch points has four-way functionality or larger.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerisable liquid-crystalline compounds, and liquid-crystalline polymers.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" means a polymerisable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerisable compounds, etc.

Polymerisable compounds with one polymerisable group are also referred to as "monoreactive" or "monofunctional" compounds, compounds with two polymerisable groups as "direactive" or "difunctional" compounds, and compounds with more than two polymerisable groups as "multireactive" or "multifunctional" compounds. Compounds without a polymerisable group are also referred to as "non-reactive or non-polymerisable" compounds.

The terms "LC mixture", "LC material", "LC formulation" and "LC medium" are used throughout the whole application synonymously.

The term "non-mesogenic compound or material" means a compound or material that does not contain a mesogenic group as defined above or below.

Visible or VIS light is electromagnetic radiation that has wavelength in a range from about 400 nm to about 740 nm. Ultraviolet or UV light is electromagnetic radiation with a wavelength in a range from about 200 nm to about 400 nm.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

The melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees Celsius.

The term "clearing point" means the temperature at which the transition between the mesophase with the highest temperature range and the isotropic phase occurs.

The term "director" is known in the art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of an liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The term "planar structure" or "planar orientation" refers to a film wherein the optical axis is substantially parallel to the film plane.

The term "negative (optical) dispersion" refers to a birefringent or liquid crystalline material or layer that displays reverse birefringence dispersion where the magnitude of the birefringence (Δn) increases with increasing wavelength (λ), i.e., $|\Delta n(450)| < |\Delta n(550)|$, or $\Delta n(450)/\Delta n(550) < 1$, where Δn(450) and Δn(550) are the birefringence of the material measured at wavelengths of 450 nm and 550 nm respectively. In contrast, positive (optical) dispersion" means a material or layer having, for example, $|\Delta n(450)| > |\Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [R(λ)=Δn(λ)·d], the optical dispersion can be expressed either as the "birefringence dispersion" by the ratio Δn(450)/Δn(550), or as "retardation dispersion" by the ratio R(450)/R(550), wherein R(450) and R(550) are the retardation of the material measured at wavelengths of 450 nm and 550 nm respectively. Since the layer thickness d does not change with the wavelength, R(450)/R(550) is equal to Δn(450)/≠n(550). Thus, a material or layer with negative or reverse dispersion has R(450)/R(550)<1 or |R(450)|<|R(550)|, and a material or layer with positive or normal dispersion has R(450)/R(550)>1 or |R(450)|>|R(550)|.

In the present invention, unless stated otherwise "optical dispersion" means the retardation dispersion, i.e., the ratio R(450)/R(550).

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometers of a birefringent sample, e.g., quartz over a range of wavelengths typically, 370 nm to 2000 nm. From this data it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer. The term "C plate" refers to an optical retarder utilizing a layer of uniaxially birefringent material with its extraordinary axis oriented perpendicular to the plane of the layer. In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate". An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n = n_e - n_o$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. Δn can then be calculated from the above equations.

In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkynyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms. Further preferred carbyl and hydrocarbyl groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ aryl-alkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoro-methyl, perfluoro-n-butyl, 2,2,2-trifluoroethyl, perfluorooctyl, perfluoro-hexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e., they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzo-pyrene, fluorene, indene, indenofluorene, spirobifluorene, etc.

Preferred heteroaryl groups are, for example, 5-membered ring groups, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered ring groups, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazin-imidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e., those that contain exclusively single bonds, and partially unsaturated rings, i.e., those that also contain multiple bonds, for example, double bonds. Heterocyclic rings contain one or more heteroatoms, preferably selected from Si, O, N, S, and Se.

The (non-aromatic) alicyclic and heterocyclic groups can be monocyclic, i.e., contain only one ring (such as, for example, cyclohexane), or polycyclic, i.e., contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —OH, —CN, —NO$_2$, —NCO, —NCS, —OCN, —SCN, —C(=O)N(R$^x$)$_2$, —C(=O)Y$^x$, —C(=O)R$^x$, —C(=O)OR$^x$, —N(R$^x$)$_2$, in which R$^x$ has the above-mentioned meaning, and above Y$^x$ denotes halogen, optionally substituted silyl, optionally substituted aryl or heteroaryl having 4 to 40, preferably 4 to 20 ring atoms, and straight-chain or branched alkyl, alkenyl, alkynyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, R$^y$, —OR$^y$, —CO—R$^y$, —CO—O—R$^y$, —O—CO—R$^y$ or —O—CO—O—R$^y$, in which R$^y$ denotes H, a straight-chain, branched or cyclic alkyl chain having 1 to 12 C atoms.

In the formula shown above and below, a substituted phenylene ring

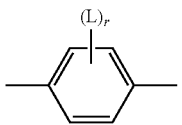

is preferably

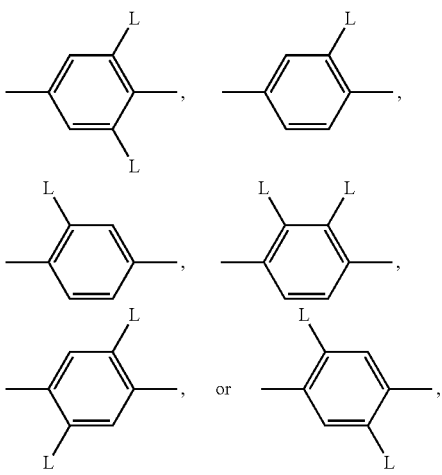

in which L has, on each occurrence identically or differently, one of the meanings given above and below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, most preferably F, Cl, CH$_3$, OCH$_3$, COCH$_3$ or OCF$_3$.

"Halogen" denotes F, Cl, Br or I, preferably F.

"Polymerisable groups" (P) are preferably selected from groups containing a C=C double bond or C≡C triple bond, and groups which are suitable for polymerisation with ring opening, such as, for example, oxetane or epoxide groups.

Preferably, the polymerisable groups (P) are selected from the group consisting of CH$_2$=CW$^1$—COO—, CH$_2$=CW$^1$—CO—,

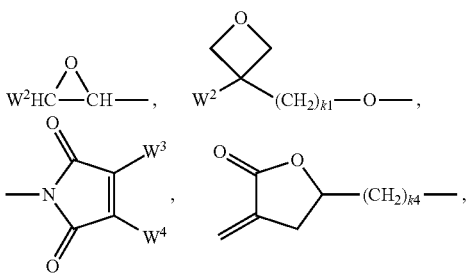

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, in which W$^1$ denotes H, F, Cl, CN, CF$_3$, phenyl or alkyl having 1 to 5 C atoms, in particular H, F, Cl or CH$_3$, W$^2$ denotes H or alkyl having 1 to 5 C atoms, in particular H, methyl, ethyl or n-propyl, W$^3$ and W$^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl, and k$_1$, k$_2$ and k$_3$ each, independently of one another, denote 0 or 1, k$_3$ preferably denotes 1, and k$_4$ is an integer from 1 to 10.

Particularly preferred groups P are CH$_2$=CH—COO—, CH$_2$=C(CH$_3$)—COO—, CH$_2$=CF—COO—, CH$_2$=CH—, CH$_2$=CH—O—, (CH$_2$=CH)$_2$CH—OCO—, (CH$_2$=CH)$_2$CH—O—,

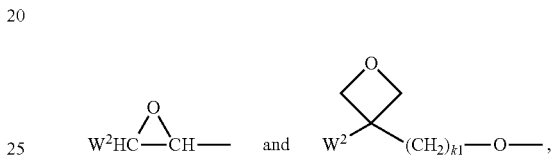

in which W$^2$ denotes H or alkyl having 1 to 5 C atoms, in particular H, methyl, ethyl or n-propyl, Further preferred groups (P) are vinyloxy, acrylate, methacrylate, fluoroacrylate, chloroacrylate, oxetane and epoxide, most preferably acrylate or methacrylate, in particular acrylate.

Preferably, all multireactive polymerisable compounds and sub-formulae thereof contain instead of one or more radicals P-Sp-, one or more branched radicals containing two or more polymerisable groups P (multireactive polymerisable radicals).

Suitable radicals of this type, and polymerisable compounds containing them, are described, for example, in U.S. Pat. No. 7,060,200 B1 or US 2006/0172090 A1.

Particular preference is given to multireactive polymerisable radicals selected from the following formulae:

| | |
|---|---|
| —X-alkyl-CHP$^x$—CH$_2$—CH$_2$P$^y$ | I*a |
| —X-alkyl-C(CH$_2$P$^x$)(CH$_2$P$^y$)—CH$_2$P$^z$ | I*b |
| —X-alkyl-CHP$^x$CHP$^y$—CH$_2$P$^z$ | I*c |
| —X-alkyl-C(CH$_2$P$^x$)(CH$_2$P$^y$)—C$_{aa}$H$_{2aa+1}$ | I*d |
| —X-alkyl-CHP$^x$—CH$_2$P$^y$ | I*e |
| —X-alkyl-CHP$^x$P$^y$ | I*f |
| —X-alkyl-CP$^x$P$^y$—C$_{aa}$H$_{2aa+1}$ | I*g |
| —X-alkyl-C(CH$_2$P$^y$)(CH$_2$P$^w$)—CH$_2$OCH$_2$—C(CH$_2$P$^x$)(CH$_2$Py)CH$_2$P$^z$ | I*h |
| —X-alkyl-CH((CH$_2$)$_{aa}$P$^x$)((CH$_2$)$_{bb}$P$^y$) | I*i |
| —X-alkyl-CHP$^x$CHP$^y$—C$_{aa}$H$_{2aa+1}$ | I*k | in which alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N($R^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where $R^x$ has one the above-mentioned meaning, aa and bb each, independently of one another, denote 0, 1, 2, 3, 4, 5 or 6, X has one of the meanings indicated for X' defined below, and $P^v$ to $P^z$ each, independently of one another, have one of the meanings indicated above for P.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^{xx}$—, —$SiR^{xx}R^{yy}$—, —CO—, —COO—, —OCO—, —OCO—O—, —S—CO—, —CO—S—, —$NR^{xx}$—CO—O—, —O—CO—$NR^{xx}$—, —$NR^{xx}$—CO—$NR^{yy}$—, —CH=CH— or —C≡C— in such a way that O and/or S atoms are not linked directly to one another, X' denotes —O—, —S—, —CO—, —COO—, —OCO—, —O—COO—, —CO—$NR^{xx}$—, —$NR^{xx}$—CO—, —$NR^{xx}$—CO—$NR^{yy}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^{xx}$—, —$CY^{xx}$=$CY^{yy}$—, —C≡C—, —CH∇CH—COO—, —OCO—CH=CH— or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably —O—, —S— —CO—, —COO—, —OCO—, —O—COO—, —CO—$NR^{xx}$—, —$NR^{xx}$—CO—, —$NR^{xx}$—CO—$NR^{yy}$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^{xx}R^{yy}$—$O)_{p1}$—, in which p1 is an integer from 1 to 12, q1 is an integer from 1 to 3, and $R^{xx}$ and $R^{yy}$ have the above-mentioned meanings.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethyl-ene-N-methyliminoethylene, 1-methylalkylene, ethenylene, propenylene and butenylene.

For the present invention,

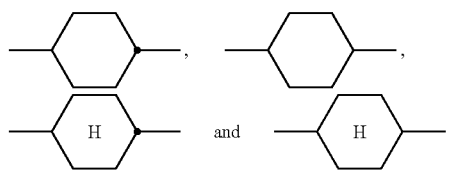

denote trans-1,4-cyclohexylene, and

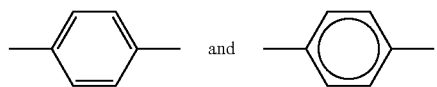

denote 1,4-phenylene.

For the present invention the arouos —COO— or —$CO_2$— denote an ester group of formula

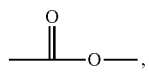

and the groups —OCO—, —$O_2C$— or —OOC— denote an ester group of formula

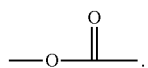

DETAILED DESCRIPTION

Preferably, di- or multireactive mesogenic compounds of formula I are selected from the group of compounds of formulae I-1 to I-3

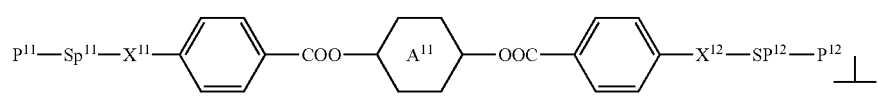

I-1

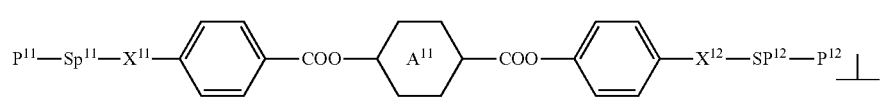

I-2

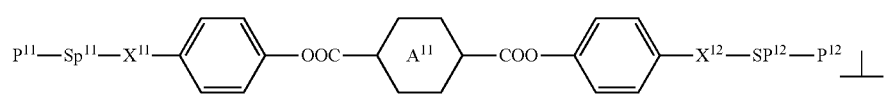

I-3 wherein
A$^{11}$, P$^{11}$ and P$^{12}$, Sp$^{11}$ and Sp$^{12}$, and X$^{11}$ and X$^{12}$ have one of the meanings as given above under formula I.

Further preferred compounds of formula I are selected from the group of compounds of the following formulae,

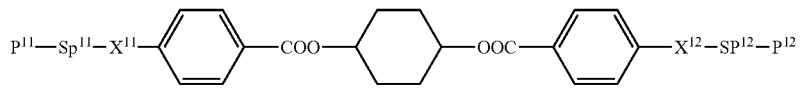
I-1a

I-2a

I-3a

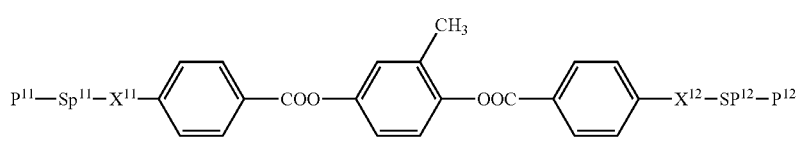
I-1b

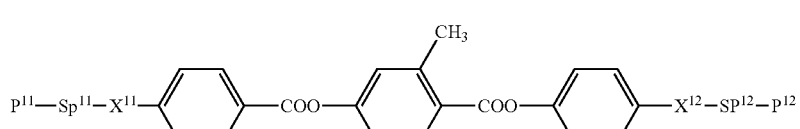
I-2b

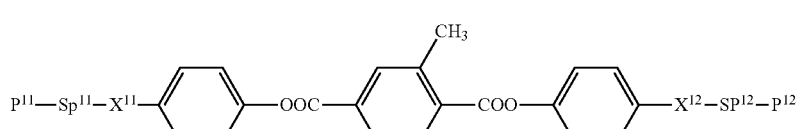
I-3b wherein
P$^{11}$ and P$^{12}$, Sp$^{11}$ and Sp$^{12}$, and X$^{11}$ and X$^{12}$ have one of the meanings as given above under formula I.

In particular preferred compounds of formula I are selected from the group of compounds of the following formulae, wherein
P$^{11}$ and P$^{12}$ have one of the meanings as given above under formula I, and are preferably both a methacrylic or acrylic group, more preferably both an acrylic group, and n and m denote are each and independently denote an integer from 1 to 12, preferably an integer from 3 to 6, and more preferably denote both 3, 4 or 6, most preferably both denote 3 or 6 in formulae I-2b-1 and I-3a-1, and both denote 4 in formula I-2b-2.

I-3a-1

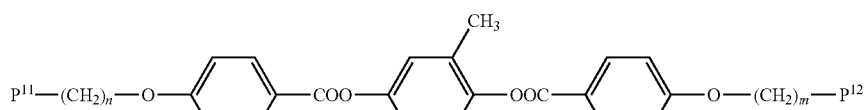
I-2b-1

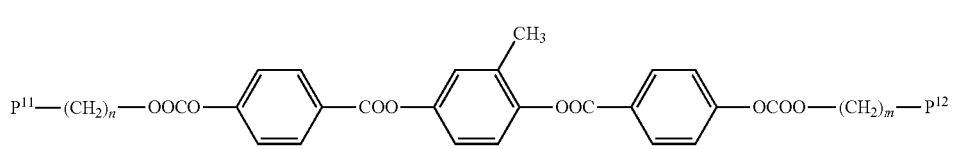
I-2b-2

Preferably, the proportion of direactive polymerisable mesogenic compounds of formula I in a polymerisable liquid-crystalline material according to the present invention as a whole, is preferably in the range from 20 to 80% by weight, more preferably in the range from 30 to 75% by weight and even more preferably in the range from 40 to 70% by weight.

Preferably, the proportion of the multireactive polymerizable mesogenic compounds of formula I and subformulae thereof in a polymerisable liquid-crystalline material according to the present invention as a whole is preferably in the range from 0 to 30% by weight, more preferably in the range from 0 to 20% by weight and even more preferably in the range from 0 to 10% by weight.

Preferably, the monoreactive mesogenic compounds of formula II are selected from the group of compounds of formulae II-1 to II-5,

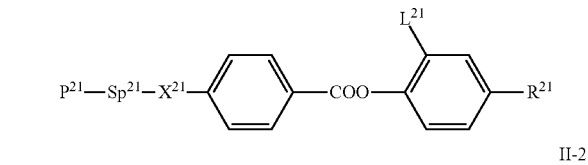

II-1

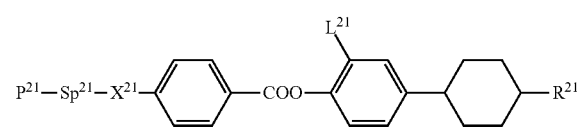

II-2

II-3

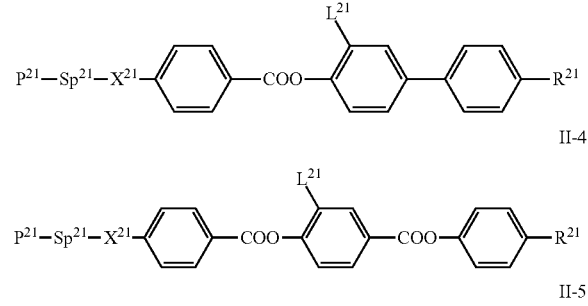

II-4

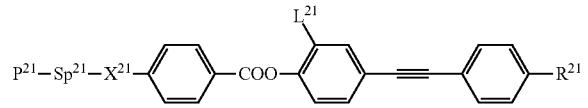

II-5 wherein, $P^{21}$, $Sp^{21}$, $X^{21}$, $L^{21}$ and $R^{21}$ have one of the meanings as given above under formula II.

Further preferred compounds of formula II are selected from the group of compounds of the following formulae,

II-1a

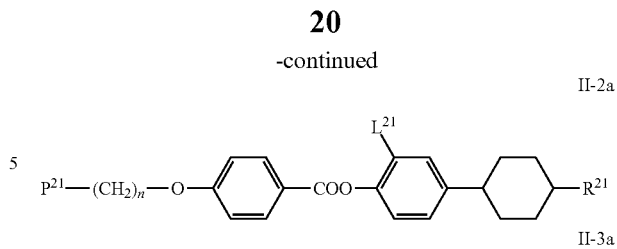

II-2a

II-3a

II-4a

II-5a wherein
$P^{21}$, $L^{21}$ and $R^{21}$ have one of the meanings as given above under formula II, and
n denotes an integer from 1 to 12.

Further preferred compounds of formula II are selected from the group of compounds of the following formulae,

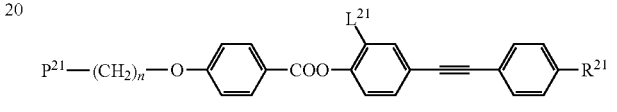

II-1a-1

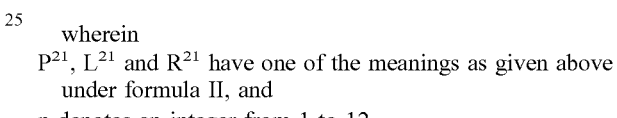

II-2a-1

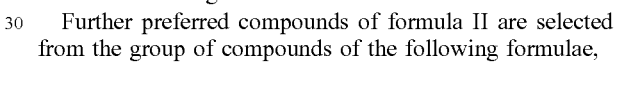

II-3a-1

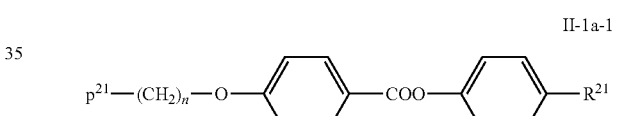

II-4a-1

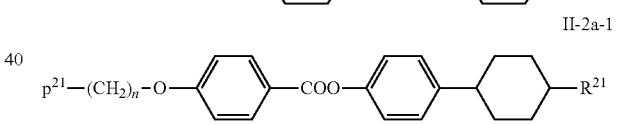

II-4a-2

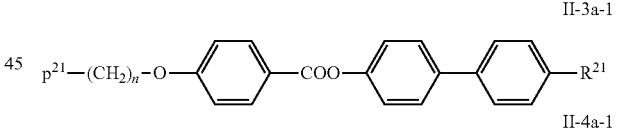

II-4a-3

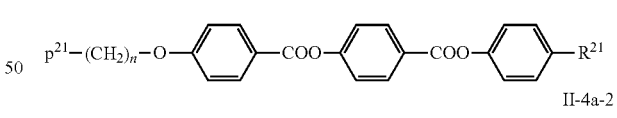

II-4a-4

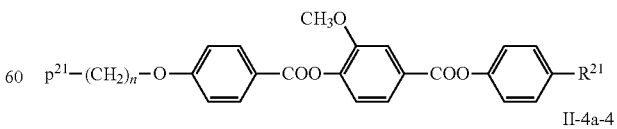

-continued

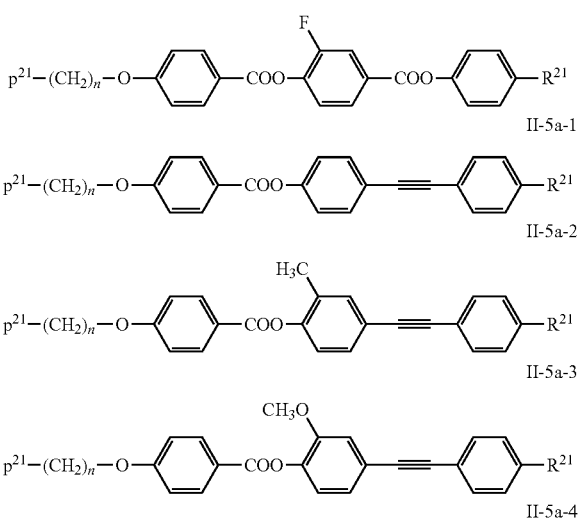

P²¹ has one of the meanings as given above under formula II, and preferably denotes a methacrylic or an acrylic group, more preferably an acrylic group, R²¹ has one of the meanings as given above under formula II and preferably denotes F, Cl, CN, or straight or branched alkyl or alkoxy group having 1 to 5 C atoms, more preferably CN, CH₃, OCH₃ or C₃H₇, and n denotes an integer from 1 to 12, preferably from 3 to 6 and more preferably 3 or 6.

Preferably, the proportion of the monoreactive polymerisable mesogenic compounds of formula II and sub formula thereof in a polymerisable liquid-crystalline material according to the present invention as a whole, is preferably in the range from 10 to 80% by weight, more preferably in the range from 15 to 70% by weight, and even more preferably in the range from 25 to 50% by weight.

Preferably, the carbazole oxime ester photoinitiator is selected from corresponding carbazole oxime ester photoinitiators as given in US 2006/0241259 A1 or EP 1780209 A1.

Further preferred carbazole oxime ester photoinitiators are selected from the group of compounds of formula CO-1,

CO-1

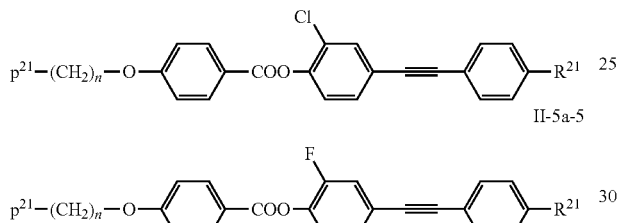

wherein
L³¹ to L³³ each and independently denotes H, alkyl, alkoxy, thioalkyl, alkylcarbonyl, alkoxycarbonyl, alkylcarbonyloxy or alkoxycarbonyloxy with 1 to 5 C atoms more; F, Cl, CN, NO₂, OCN, SCN, or mono- oligo- or polyfluorinated alkyl or alkoxy with 1 to 4 C atoms; or —(X³¹-Sp³¹-A³¹)

X³¹ denotes —O—, —S— —CO—, —COO—, —OCO—, —O—COO—, —CO—NR$^{xx}$—, —NR$^{xx}$—CO—, —NR$^{xx}$—CO—NR$^{yy}$— or a single bond.

R$^{xx}$ and R$^{yy}$ each, independently of one another, denote H or alkyl having 1 to 12 C atoms, and Sp³¹ is a spacer group or a single bond, A³¹ denotes each and independently an aryl, heteroaryl, (non-aromatic) alicyclic and heterocyclic group, optionally having one or more substituents, which substitutents are preferably selected from the group comprising silyl, sulfo, sulfonyl, formyl, amine, imine, nitrile, mercapto, nitro, halogen, C₁₋₁₂ alkyl, C₆₋₁₂ aryl, C₁₋₁₂ alkoxy, hydroxyl, or combinations of these groups, and R³² to R³⁴ each, independently of one another, denote H or alkyl having 1 to 12 C atoms.

Further preferred carbazole oxime ester photoinitiators are selected from the group of compounds of the following formulae CO-2 to CO-9,

CO-2

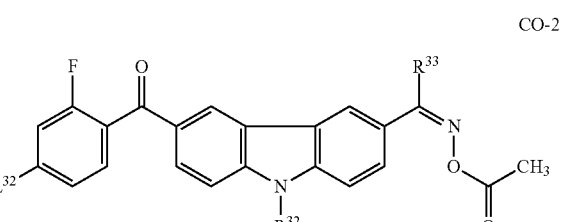

CO-3

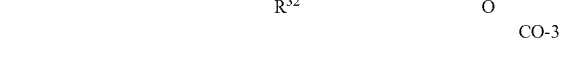

CO-4

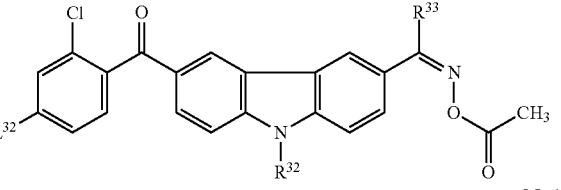

CO-5

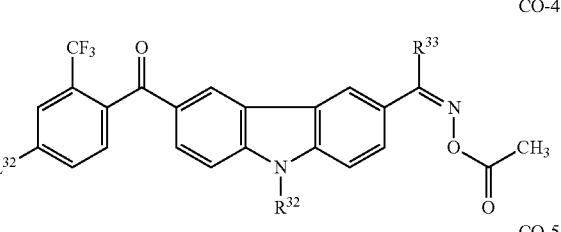

CO-6

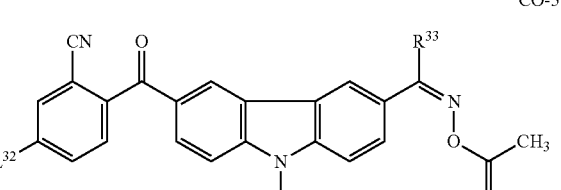

-continued

CO-7
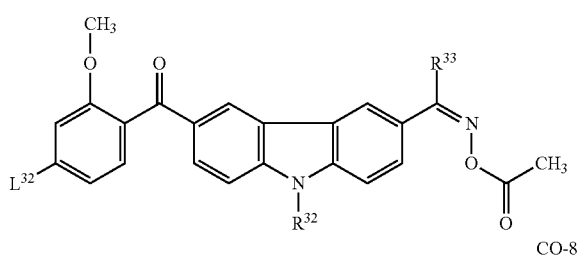

CO-8
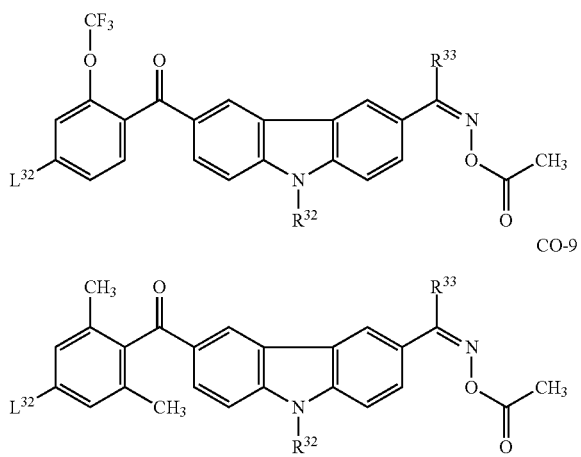

CO-9

Wherein $L^{32}$, $R^{32}$ and $R^{33}$ have one of the meanings as given above under formula CO-1.

Further preferred are carbazole oxime ester photoinitiators, which are selected from the following formula CO-10 to CO-12, CO-10
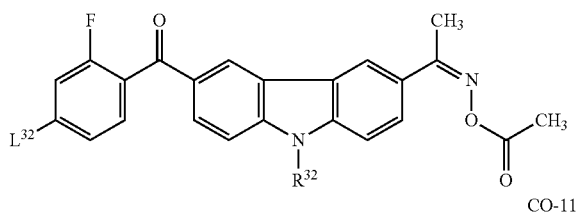

CO-11
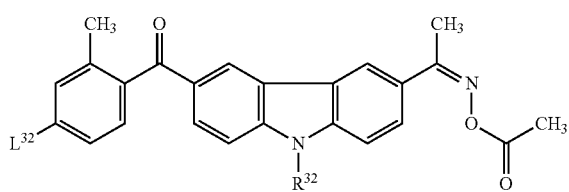

-continued

CO-12
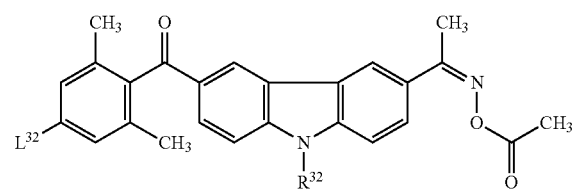

Wherein $L^{32}$ and $R^{32}$ have one of the meanings as given above under formula CO-1

Especially preferred are carbazole oxime ester photoinitiators selected from the following formula CO-13 to CO-15, CO-13
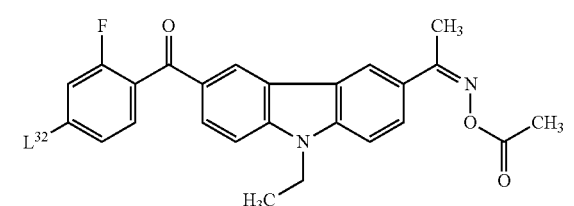

CO-14
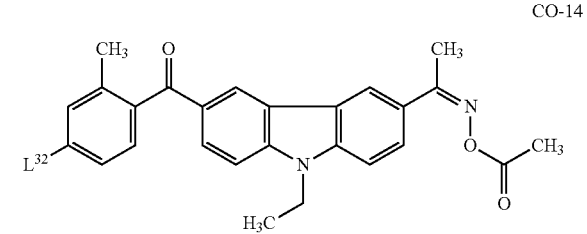

CO-15
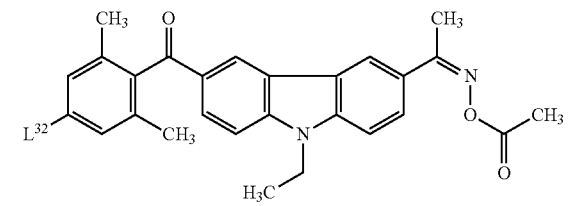

wherein $L^{32}$ has one of the meanings as given above under formula CO-1.

In particular preferred are carbazole oxime ester photoinitiators selected from the following formula CO-16 to CO-19, CO-16
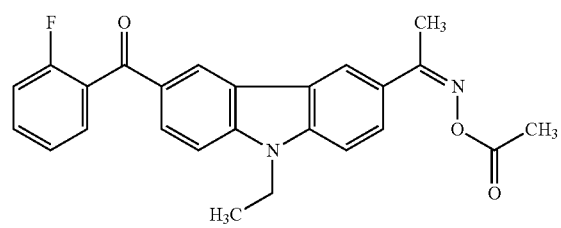

CO-17
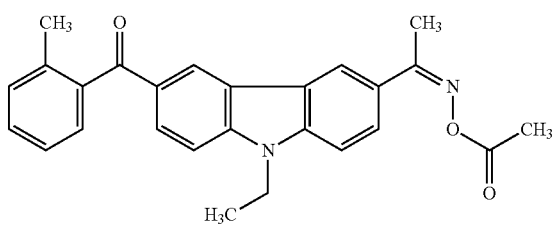

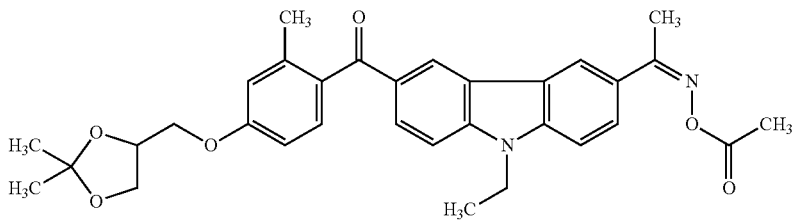

CO-18

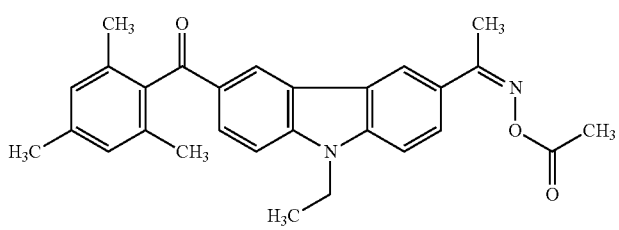

CO-19

Preferably the minimum amount of carbazole oxime ester photoinitiators in the polymerisable LC material as a whole is more than 0.5%, in particular more than 1%, most preferably more than 1.5% by weight.

Preferably, the maximum amount of carbazole oxime ester photoinitiators is preferably less than 10%, very preferably less than 7%, in particular less than 5% by weight of the whole polymerisable LC material.

In preferred embodiment, the polymerisable LC material comprises in addition to the compounds of formulae I and II and at least one carbazole oxime ester photoinitiator, also one or more further mono-, di-, or multireactive liquid-crystalline or mesogenic compounds other than compounds according to formula I or II.

Preferably, those mono-, di-, or multireactive mesogenic compounds in accordance with the present invention are preferably selected from the group of compounds of formula RM, P-Sp-MG-R      RM wherein
P is a polymerisable group, preferably an acryl, methacryl, vinyl, vinyloxy, propenyl ether, epoxy, oxetane or styrene group,
Sp is a spacer group or a single bond,
MG is a rod-shaped mesogenic group, which is preferably selected of formula M,
M is $-(A^x-Z^a)_k-A^y-(Z^b-A^z)_l$-,
$A^x$ to $A^z$ are in each occurrence independently of one another an aryl-, heteroaryl-, heterocyclic- or alicyclic group optionally being substituted by one or more identical or different groups $L^a$, preferably 1,4-cyclohexylene or 1,4-phenylene, 1,4 pyridine, 1,4-pyrimidine, 2,5-thiophene, 2,6-dithieno[3,2-b:2',3'-d]thiophene, 2,7-fluorine, 2,6-naphtalene, 2,7-phenanthrene optionally being substituted by one or more identical or different groups $L^a$,
$Z^a$ and $Z^b$ are in each occurrence independently from each other, —O—, —S—, —CO—, —COO—, —OCO—, —S—CO—, —CO—S—, —O—COO—, —CO—$NR^{RM}$—, —$NR^{RM}$—CO—, —$NR^{RM}$—CO—$NR^{RM}$, —$NR^{RM}$—CO—O—, —O—CO—$NR^{RM}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=$CR^{RM}$—, —$CY^{RM}$=$CY^{RM}$—, —C≡C—, —CH=CH—COO—, —OCO—CH=CH—, or a single bond, preferably —COO—, —OCO—, —CO—O—, —O—CO—, —OCH$_2$—, —CH$_2$O—, -, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond,
$L^a$ is F, Cl, Br, I, —CN, —NO$_2$, —NCO, —NCS, —OCN, —SCN, —C(=O)$NR^{RM}R^{RM}$, —C(=O)$OR^{RM}$, —C(=O)$R^{RM}$, —$NR^{RM}R^{RM}$, —OH, —SF$_5$, or straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, preferably F, —CN or straight chain or branched alkyl, alkoxy, alkylcarbonyl, alkoxycarbonyl, alkylcarbonyloxy or alkoxycarbonyloxy 1 to 6 C atoms,
$R^{RM}$ in each occurrence independently of each other denote H or alkyl with 1 to 12 C-atoms,
R is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y or P-Sp-,
$Y^{RM}$ in each occurrence, independently of one another, denote H, F, Cl or CN,
Y is F, Cl, CN, NO$_2$, OCH$_3$, OCN, SCN, or mono- oligo- or polyfluorinated alkyl or alkoxy with 1 to 4 C atoms, preferably F, Cl, CN, NO$_2$, OCH$_3$, or mono- oligo- or polyfluorinated alkyl or alkoxy with 1 to 4 C atoms,
k and l are each and independently 0, 1, 2, 3 or 4, preferably 0, 1 or 2, most preferably 1,
again, with the proviso that compounds according to formula I or II are excluded from the group of compounds of formula RM.

Preferably, one or more optional di- or multireactive mesogenic compounds are selected of formula DRM $P^1$-$Sp^1$-MG-$Sp^2$-$P^2$      DRM wherein
$P^1$ and $P^2$ independently of each other denote a polymerisable group, Sp¹ and Sp² independently of each other are a spacer group or a single bond, MG is a rod-shaped mesogenic group, which is preferably selected of formula MG, -(A¹-Z¹)$_n$-A²-   MG wherein A¹ and A² denote, in case of multiple occurrence independently of one another, an aromatic or alicyclic group, which optionally contains one or more heteroatoms selected from N, O and S, and is optionally mono- or polysubstituted by L¹, L¹ is P-Sp-, F, Cl, Br, I, —CN, —NO$_2$, —NCO, —NCS, —OCN, —SCN, —C(=O)NR⁰⁰R⁰⁰⁰, —C(=O)OR⁰⁰, —C(=O)R⁰⁰, —NR⁰⁰R⁰⁰⁰, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, R⁰⁰ and R⁰⁰⁰ independently of each other denote H or alkyl with 1 to 12 C-atoms, Z¹ denotes, in case of multiple occurrence independently of one another, —O—, —S—, —CO—, —COO—, —OCO—, —S—CO—, —CO—S—, —O—COO—, —CO—NR⁰⁰—, —NR⁰⁰—CO—, —NR⁰⁰—CO—NR⁰⁰⁰, —NR⁰⁰CO—O—, —O—CO—NR⁰⁰—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_{n1}$—, —CF$_2$CH$_2$—, —CH$_2$CF$_2$—, —CF$_2$CF$_2$—, —CH=N—, —N=CH—, —N=N—, —CH=CR⁰⁰—, —CY¹=CY²—, —C≡C—, —CH=CH—COO—, —OCO—CH=CH— or a single bond, Y¹ and Y² independently of each other denote H, F, Cl or CN, n is 1, 2, 3 or 4, preferably 1 or 2, most preferably 2, and n1 is an integer from 1 to 10, preferably 1, 2, 3 or 4, with the proviso, that compounds according to formula I are excluded from the group of compounds of formula DRM.

Preferred groups A¹ and A² include, without limitation, furan, pyrrol, thiophene, oxazole, thiazole, thiadiazole, imidazole, phenylene, cyclohexylene, bicyclooctylene, cyclohexenylene, pyridine, pyrimidine, pyrazine, azulene, indane, fluorene, naphthalene, tetrahydronaphthalene, anthracene, phenanthrene and dithienothiophene, all of which are unsubstituted or substituted by 1, 2, 3 or 4 groups L as defined above.

Particular preferred groups A¹ and A² are selected from 1,4-phenylene, pyridine-2,5-diyl, pyrimidine-2,5-diyl, thiophene-2,5-diyl, naphthalene-2,6-diyl, 1,2,3,4-tetrahydronaphthalene-2,6-diyl, indane-2,5-diyl, bicyclooctylene or 1,4-cyclohexylene wherein one or two non-adjacent CH$_2$ groups are optionally replaced by O and/or S, wherein these groups are unsubstituted or substituted by 1, 2, 3 or 4 groups L as defined above.

Particular preferred groups Z¹ are in each occurrence independently from another preferably selected from —COO—, —OCO—, —CH$_2$CH$_2$—, —CF$_2$O—, —OCF$_2$—, —C≡C—, —CH=CH—, —OCO—CH=CH—, —CH=CH—COO—, or a single bond, Very preferred optional multi- or direactive mesogenic compounds of formula DRM are selected from the following formulae:

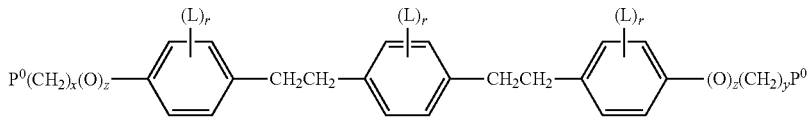

DRM1

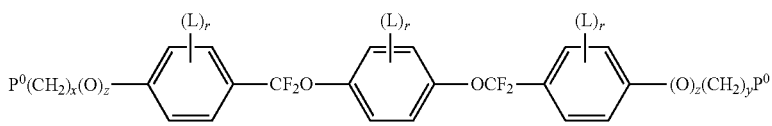

DRM2

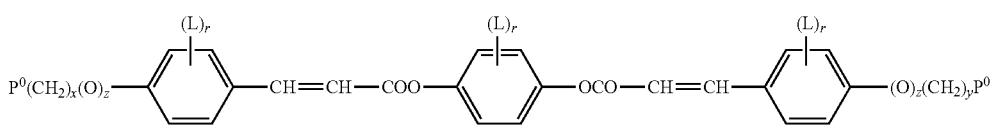

DRM3

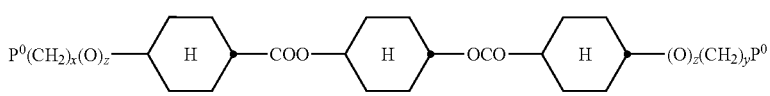

DRM4

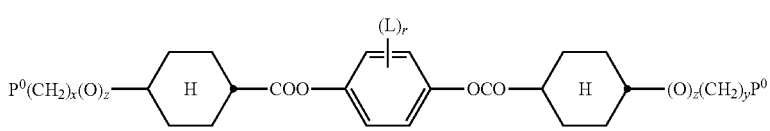

DRM5

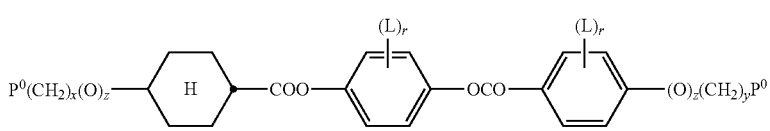

DRM6 wherein
P⁰ is, in case of multiple occurrence independently of one another, a polymerisable group, preferably an acryl, methacryl, oxetane, epoxy, vinyl, heptadiene, vinyloxy, propenyl ether or styrene group,
L has on each occurrence identically or differently one of the meanings given for $L^1$ in formula DRM, and is preferably, in case of multiple occurrence independently of one another, selected from F, Cl, CN or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
x and y are independently of each other 0 or identical or different integers from 1 to 12,
z is each and independently, 0 or 1, with z being 0 if the adjacent x or y is 0.

Preferably, one or more optional monoreactive mesogenic compounds in the polymerisable LC material are selected from formula MRM, $P^1$-$Sp^1$-MG-R      MRM wherein $P^1$, $Sp^1$ and MG have the meanings given in formula DRM,
R is H, alkyl, alkoxy, thioalkyl, alkylcarbonyl, alkoxycarbonyl, alkylcarbonyloxy or alkoxycarbonyloxy with 1 to 20 C atoms more, preferably 1 to 15 C atoms which are optionally fluorinated, or is Y, and
Y is F, Cl, CN, NO₂, OCH₃, OCN, SCN, optionally fluorinated alkylcarbonyl, alkoxycarbonyl, alkylcarbonyloxy or alkoxycarbonyloxy with 1 to 4 C atoms, or mono- oligo- or polyfluorinated alkyl or alkoxy with 1 to 4 C atoms, preferably F, Cl, CN, NO₂, OCH₃, or mono- oligo- or polyfluorinated alkyl or alkoxy with 1 to 4 C atoms, with the proviso, that compounds according to formula II are excluded from the group of compounds of formula MRM.

Preferably, one or more of the optional monoreactive mesogenic compounds of formula MRM are selected from the following formulae.

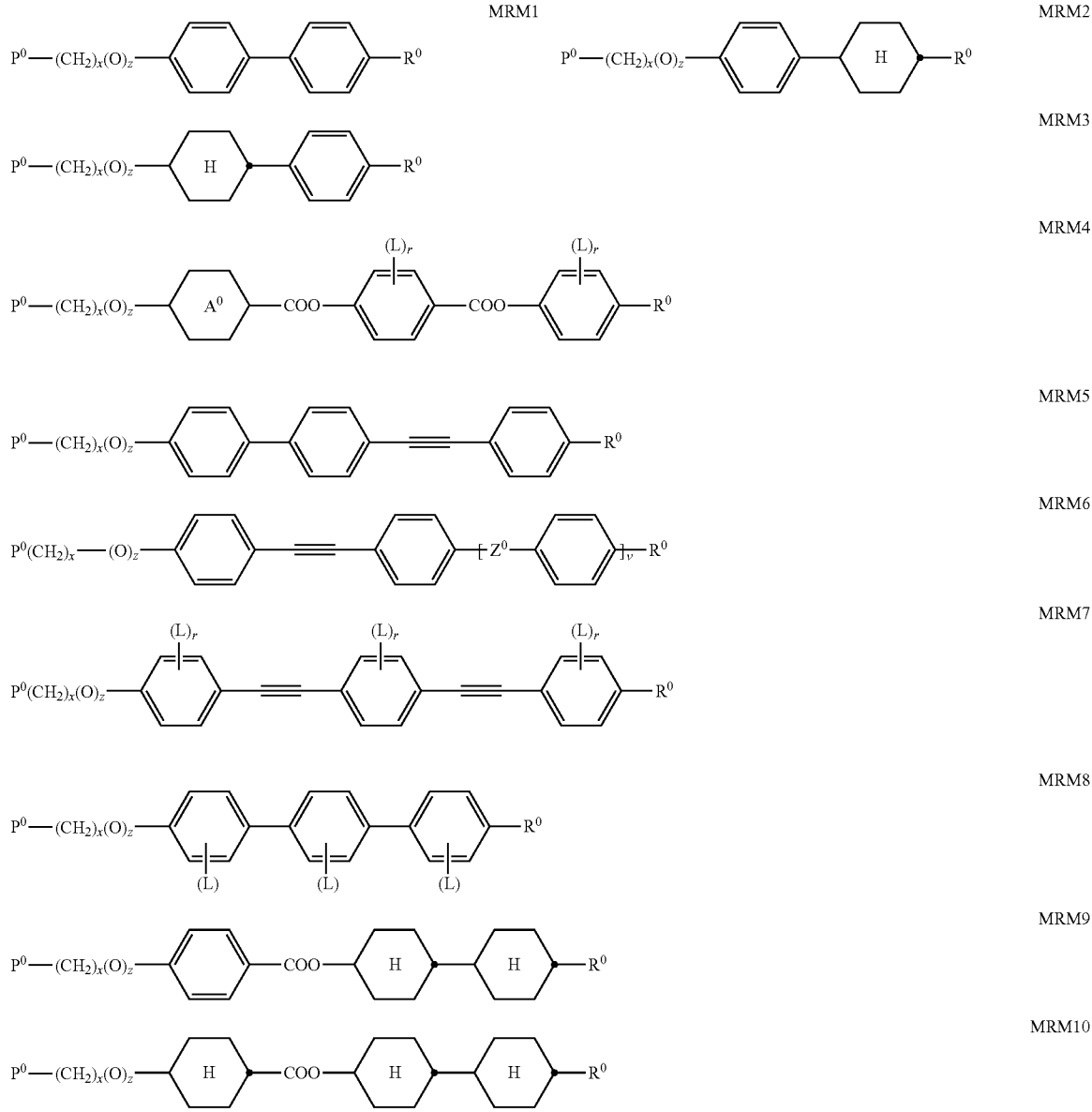

-continued
MRM11
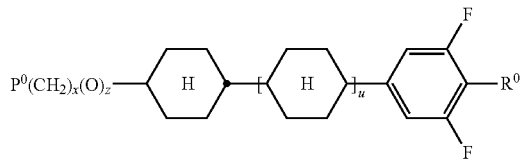
MRM12
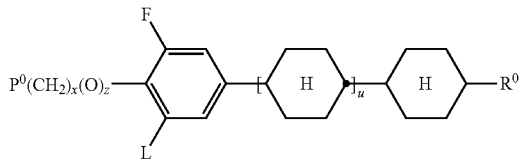
MRM13
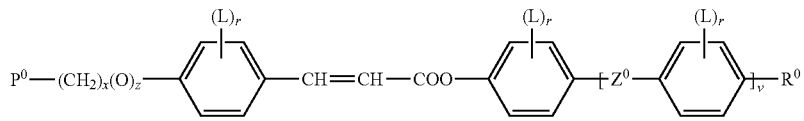
MRM14
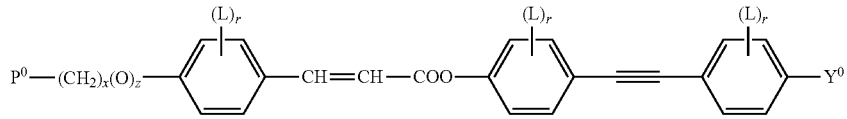
MRM15
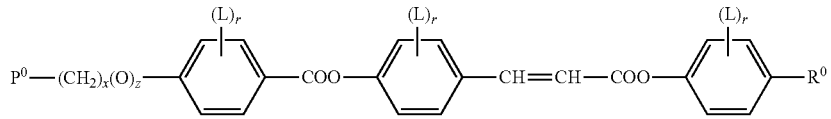
MRM16
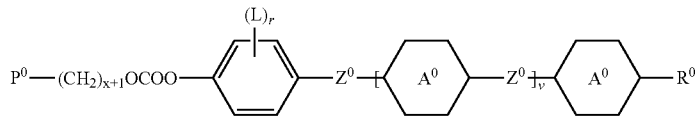
MRM17
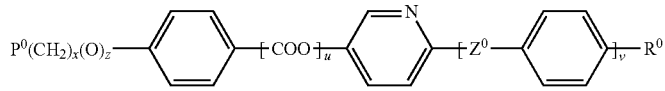
MRM18
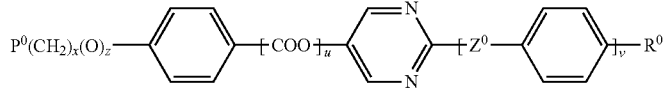
MRM19
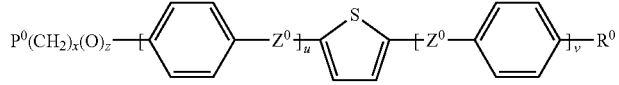
MRM20
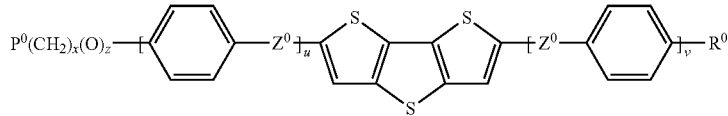
MRM21
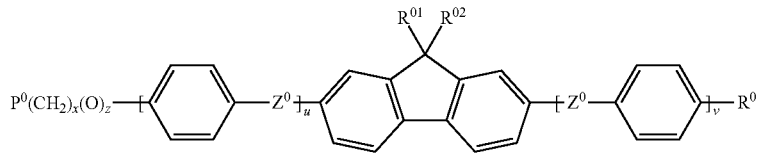
MRM22
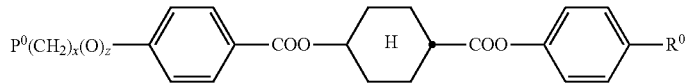
MRM23
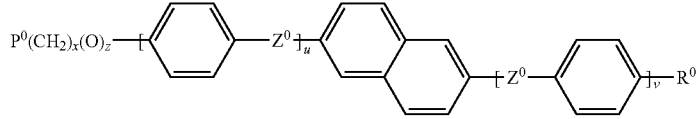

MRM24

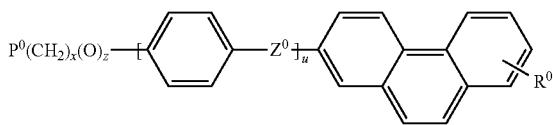

wherein P⁰, L, r, x, y and z are as defined in formula DRM1 to formula DRM6,

R⁰ is alkyl, alkoxy, thioalkyl, alkylcarbonyl, alkoxycarbonyl, alkylcarbonyloxy or alkoxycarbonyloxy with 1 or more, preferably 1 to 15 C atoms or denotes Y⁰, Y⁰ is F, Cl, CN, NO₂, OCH₃, OCN, SCN, SF₅, or mono- oligo- or polyfluorinated alkyl or alkoxy with 1 to 4 C atoms, Z⁰ is —COO—, —OCO—, —CH₂CH₂—, —CF₂O—, —OCF₂—, —CH═CH—, —OCO—CH═CH—, —CH═CH—COO—, or a single bond, A⁰ is, in case of multiple occurrence independently of one another, 1,4-phenylene that is substituted with 1, 2, 3 or 4 groups L, or trans-1,4-cyclohexylene, u and v are independently of each other 0, 1 or 2.

The proportion of all mono-, di- or multireactive liquid-crystalline compounds of formula I, II and, optionally RM, in a polymerisable liquid-crystalline material according to the present invention as a whole, is preferably in the range from 50 to 99.9% by weight, more preferably in the range from 60 to 99.9% by weight and even more preferably in the range from 70 to 99.9% by weight of the whole polymerisable LC material.

In a further preferred embodiment, the polymerisable LC material comprises at least one direactive mesogenic compound selected from a compound of formula I, at least one monoreactive mesogenic compound selected from formula II, at least one carbazole oxime ester photoinitiator and no additional compounds of formula RM.

In a further preferred embodiment, the polymerisable LC material comprises at least one direactive mesogenic compound selected from a compound of formula I, at least one monoreactive mesogenic compound selected from formula II, at least one carbazole oxime ester photoinitiator and one or more additional compounds of formula RM.

In a further preferred embodiment, the polymerisable LC material comprises at least one direactive mesogenic compound selected from a compound of formula I, at least two monoreactive mesogenic compounds selected from formula II, at least one carbazole oxime ester photoinitiator, and optionally one or more additional compounds of formula RM.

In a further preferred embodiment, the polymerisable LC material comprises at least two direactive mesogenic compounds selected from a compound of formula I, at least one monoreactive mesogenic compound selected from formula II, at least one carbazole oxime ester photoinitiator and optionally one or more additional compounds of formula RM.

In a further preferred embodiment, the polymerisable LC material comprises at least two direactive mesogenic compounds selected from a compound of formula I, at least two monoreactive mesogenic compounds selected from formula II, at least one carbazole oxime ester photoinitiator and optionally one or more additional compounds of formula RM.

The compounds of the formulae I, II, CO, RM, DRM, MRM, and sub-formulae thereof are commercially available or can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

In a further preferred embodiment the polymerisable LC material does not contain compounds having more than two polymerisable groups.

In a further preferred embodiment the polymerisable LC material is an achiral material, i.e. it does not contain any chiral compounds.

In a further preferred embodiment, the polymerisable LC material as described above comprises optionally one or more compounds of formula ND,

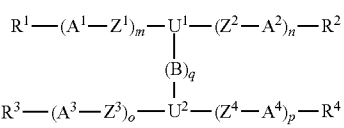

ND wherein $U^{1,2}$ are independently of each other selected from

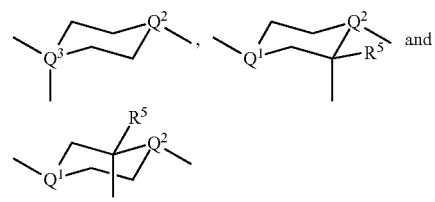

and including their mirror images, wherein the rings $U^1$ and $U^2$ are each bonded to the group —(B)$_q$— via the axial bond, and one or two non-adjacent CH₂ groups in these rings are optionally replaced by O and/or S, and the rings $U^1$ and $U^2$ are optionally substituted by one or more groups L, $Q^{1,2}$ are independently of each other CH or SiH, $Q^3$ is C or Si, B is in each occurrence independently of one another —C≡C—, —CY¹═CY²— or an optionally substituted aromatic or heteroaromatic group, $Y^{1,2}$ are independently of each other H, F, Cl, CN or R⁰, q is an integer from 1 to 10, preferably 1, 2, 3, 4, 5, 6 or 7, $A^{1-4}$ are independently of each other selected from non-aromatic, aromatic or heteroaromatic carbocyclic or heterocyclic groups, which are optionally substituted by one or more groups R⁵, and wherein each of -(A¹-Z¹)$_m$—U¹—(Z²-A²)$_n$- and -(A³-Z³)$_o$—U²—(Z⁴-A⁴)$_p$- does not contain more aromatic groups than non-aromatic groups and preferably does not contain more than one aromatic group, $Z^{1-4}$ are independently of each other —O—, —S—, —CO—, —COO—, —OCO—, —O—COO—, —CO—

—NR⁰—, —NR⁰—CO—, —NR⁰—CO—NR⁰⁰—,
—OCH₂—, —CH₂O—, —SCH₂—, —CH₂S—,
—CF₂O—, —OCF₂—, —CF₂S—, —SCF₂—,
—CH₂CH₂—, —(CH₂)₃—, —(CH₂)₄—, —CF₂CH₂—,
—CH₂CF₂—, —CF₂CF₂—, —CH=CH—,
—CY¹=CY²—, —CH=N—, —N=CH—, —N=N—,
—CH=CR⁰—, —C≡C—, —CH=CH—COO—,
—OCO—CH=CH—, CR⁰R⁰⁰ or a single bond, R⁰ and R⁰⁰ are independently of each other H or alkyl with 1 to 12 C-atoms, m and n are independently of each other 0, 1, 2, 3 or 4, o and p are independently of each other 0, 1, 2, 3 or 4, $R^{1-5}$ are independently of each other identical or different groups selected from H, halogen, —CN, —NC, —NCO, —NCS, —OCN, —SCN, —C(=O)NR⁰R⁰⁰, —C(=O)X⁰, —C(=O)R⁰, —NH₂, —NR⁰R⁰⁰, —SH, —SR⁰, —SO₃H, —SO₂R⁰, —OH, —NO₂, —CF₃, —SF₅, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerisable group, Sp is a spacer group or a single bond.

Preferably, the subgroups forming the bridging group B in formula ND are preferably selected from groups having a bonding angle of 120° or more, preferably in the range of 180°. Very preferred are —C≡C— groups or divalent aromatic groups connected to their adjacent groups in para-position, like, e.g., 1,4-phenylene, naphthalene-2,6-diyl, indane-2,6-diyl or thieno[3,2-b]thiophene-2,5-diyl.

Further possible subgroups for B include —CH=CH—, —CY¹=CY²—, —CH=N—, —N=CH—, —N=N— and —CH=CR⁰— wherein Y¹, Y², R⁰ have the meanings given above.

Preferably the bridging group, or —(B)$_q$— in formula ND, comprises one or more groups selected from the group consisting of —C≡C—, optionally substituted 1,4-phenylene and optionally substituted 9H-fluorene-2,7-diyl. The subgroups, or B in formula ND, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula ND, is selected from —C≡C—, —C≡C—C≡C—, —C≡C—C≡C—C≡C—, —C≡C—C≡C—C≡C—C≡C—,

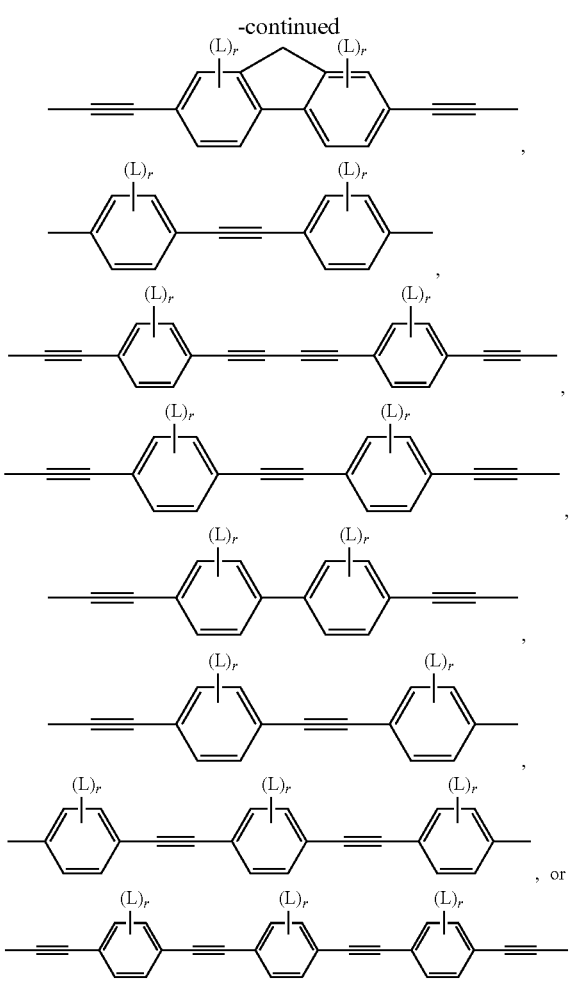

wherein r is 0, 1, 2, 3 or 4 and L has the meaning as described above.

Preferably, the non-aromatic rings of the mesogenic groups where the bridging group is attached, like U¹ and U² in formula ND, are preferably selected from

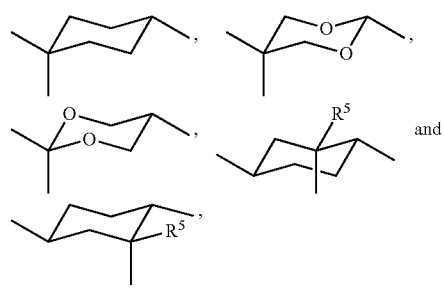

wherein R⁵ is as defined in formula ND.

Preferably, the aromatic groups $A^{1-4}$ in formula ND, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and that are optionally substituted.

Preferably, the non-aromatic carbocyclic and heterocyclic rings $A^{1-4}$ in the compounds of formula ND, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

Preferably the non-aromatic and aromatic rings, or $A^{1-4}$ in formula ND, are selected from trans-1,4-cyclohexylene and 1,4-phenylene that is optionally substituted with one or more groups L.

Very preferred are compounds of formula ND, wherein m and p are 1 and n and o are 1 or 2. Further preferred are compounds of formula ND, wherein m and p are 1 or 2 and n and o are 0. Further preferred are compounds wherein m, n, o and p are 2.

In the compounds of formula ND, the linkage groups connecting the aromatic and non-aromatic cyclic groups in the mesogenic groups, or $Z^{1-4}$, are preferably selected from —O—, —S—, —CO—, —COO—, —OCO—, —O—COO—, —CO—NR$^o$—, —NR$^o$—CO—, —NR$^o$—CO—NR$^o$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^o$—, —C≡C—, —CH=CH—COO—, —OCO—CH=CH—, CR$^o$R$^{oo}$ or a single bond, very preferably from —COO—, —OCO— and a single bond.

Preferably, in the compounds of formula ND, the substituents on the rings, such as L, are preferably selected from P-Sp-, F, Cl, Br, I, —CN, —NO$_2$, —NCO, —NCS, —OCN, —SCN, —C(=O)NR$^o$R$^{oo}$, —C(=O)X, —C(=O)OR$^o$, —C(=O)R$^o$, —NR$^o$R$^{oo}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^o$ and R$^{oo}$ are as defined in formula ND and X is halogen.

Preferably, the compounds of formula ND comprise one or more terminal groups, like $R^{1-4}$, or substituents, like $R^5$, that are substituted by two or more polymerisable groups P or P-Sp- (multifunctional polymerisable groups). Suitable multifunctional polymerisable groups of this type are disclosed for example in U.S. Pat. No. 7,060,200 B1 or US 2006/0172090 A1.

Very preferred compounds of formula ND are those of the following sub formulae:

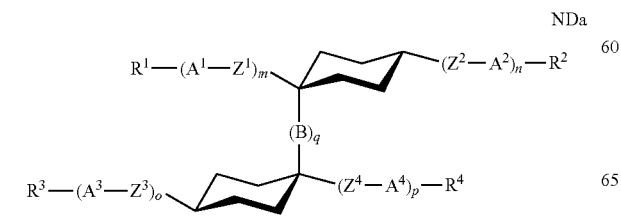

NDa

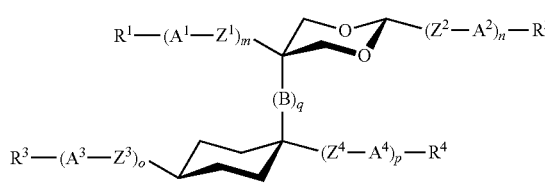

NDb

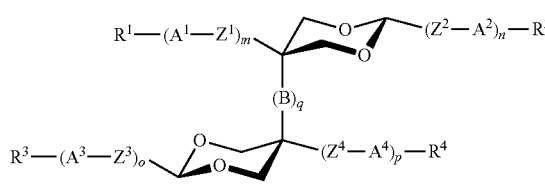

NDc

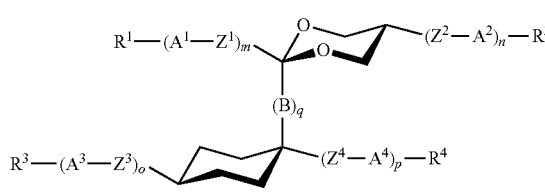

NDd

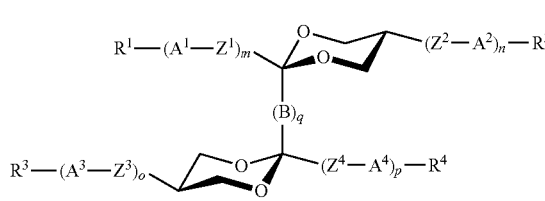

NDe

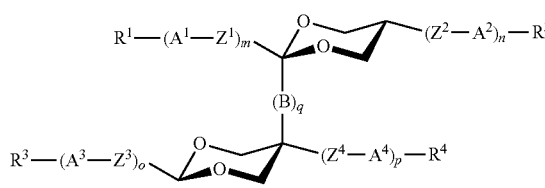

NDf

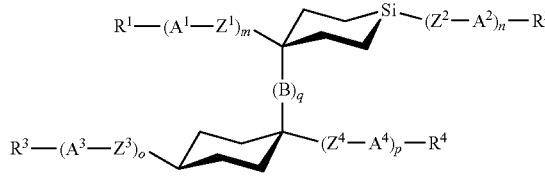

NDg

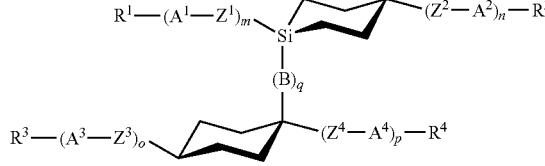

NDh

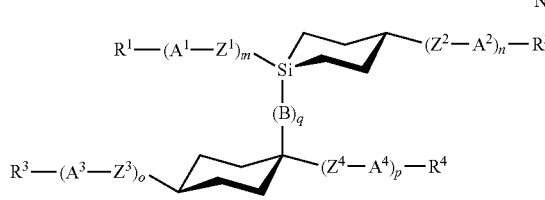

-continued
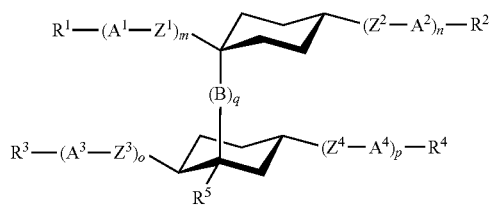
NDi
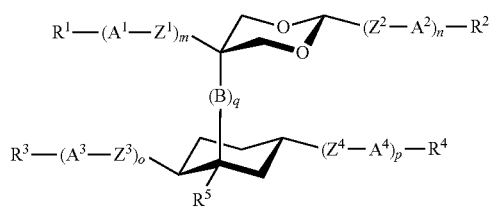
NDk
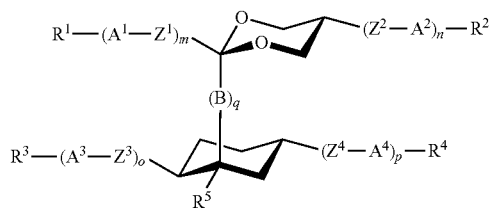
NDm
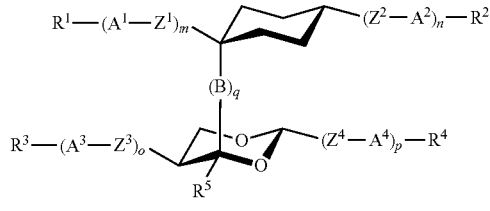
NDn
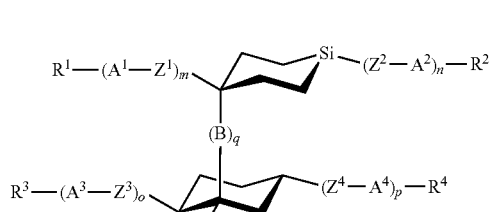
NDo
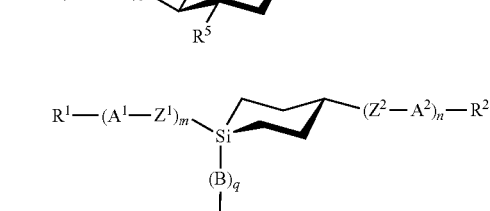
NDp
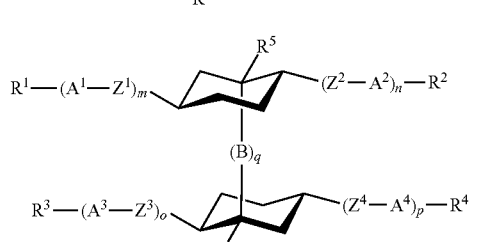
NDq
-continued
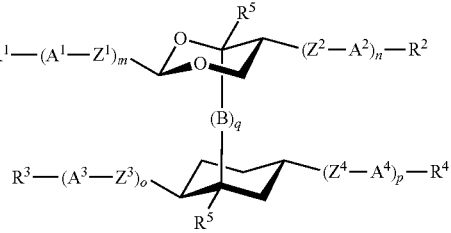
NDr
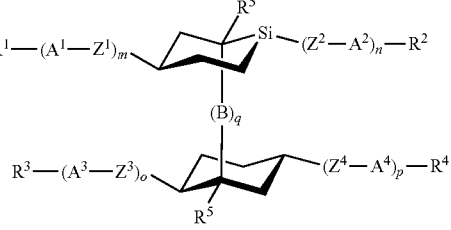
NDs
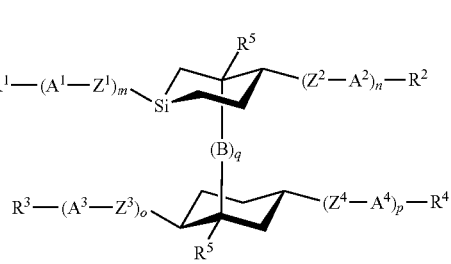
NDt
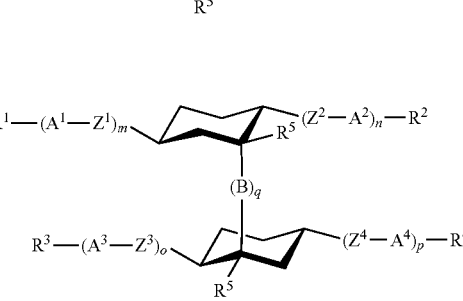
NDu
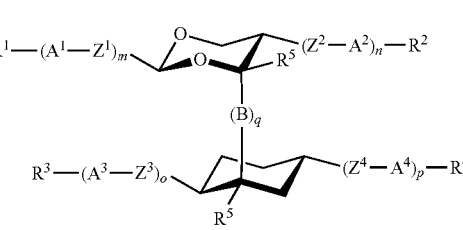
NDv
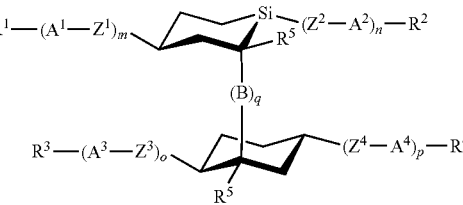
NDw

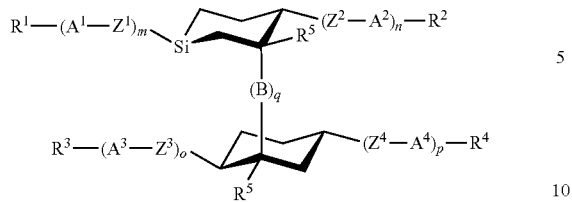
wherein $R^{1-5}$, $A^{1-4}$, $Z^{1-4}$, B, m, n, o, p and q have one the meanings given above.
Especially preferred are compounds of the following sub formulae:
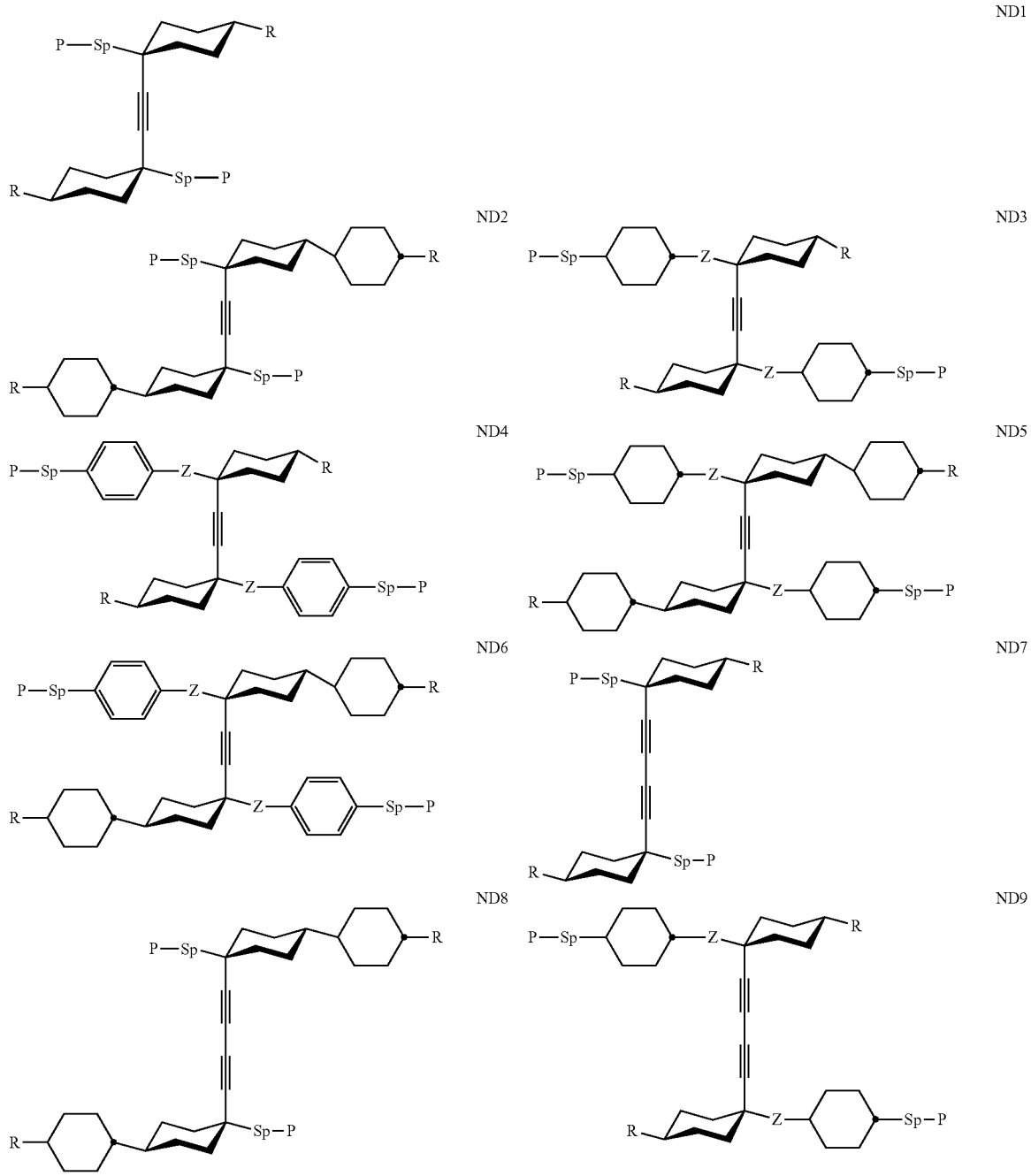

-continued
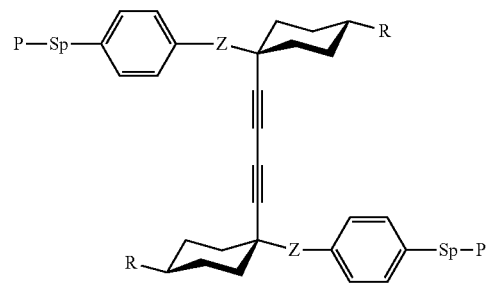
ND10
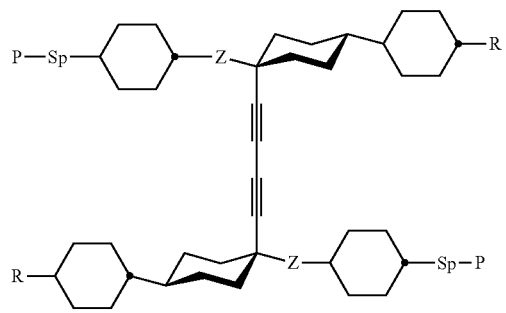
ND11
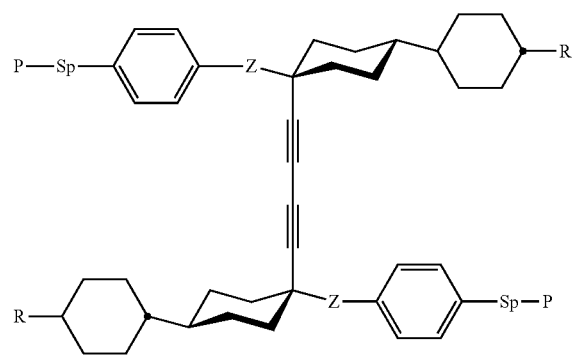
ND12
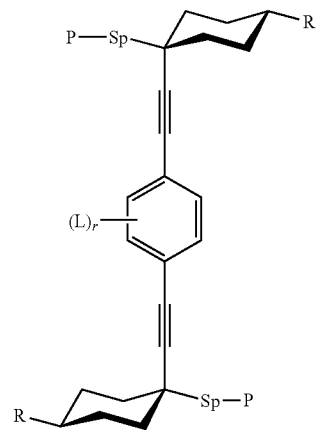
ND13
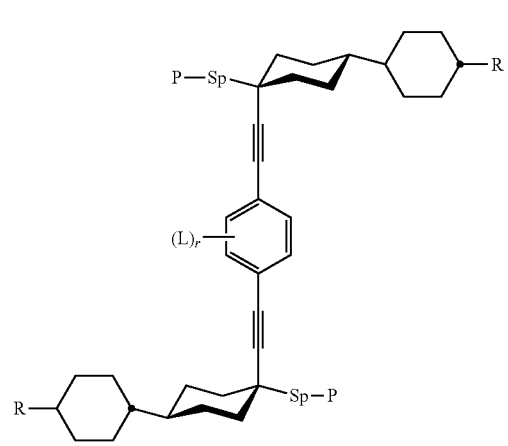
ND14
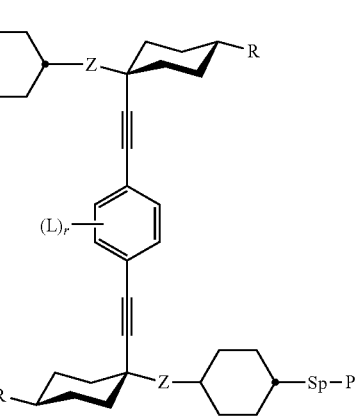
ND15

ND16
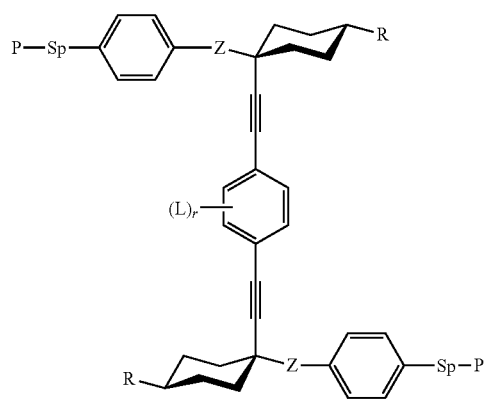
ND17
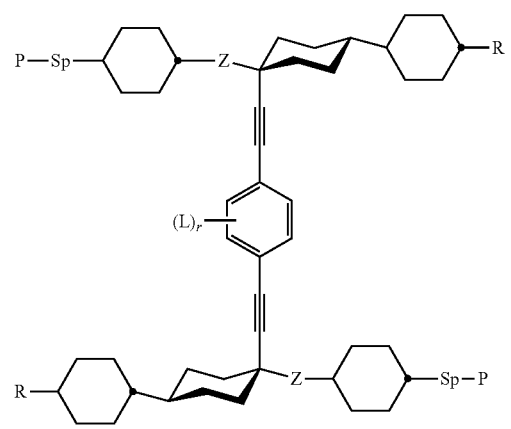
ND18
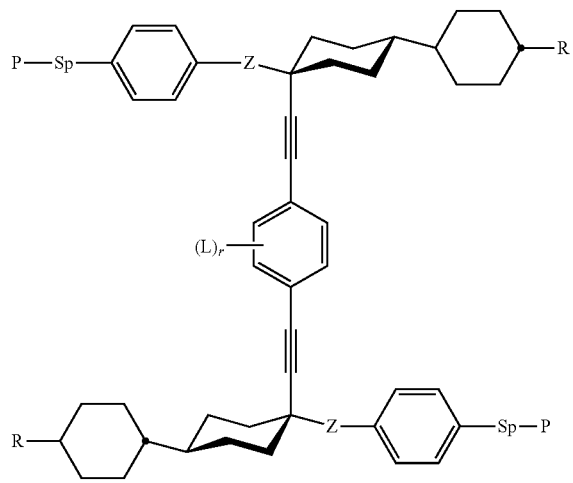
ND19
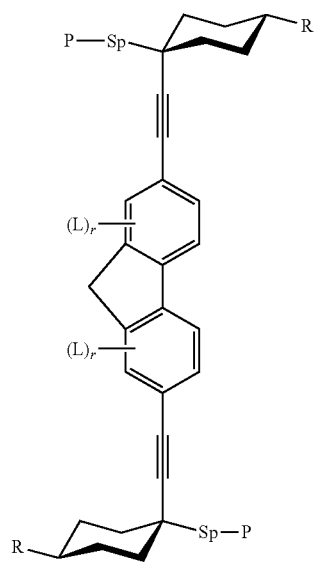

-continued
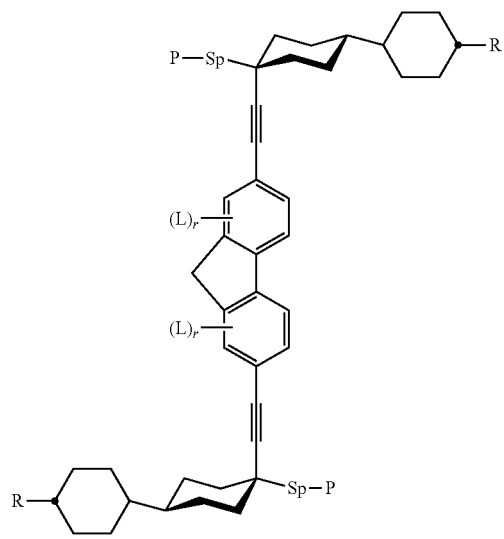
ND20
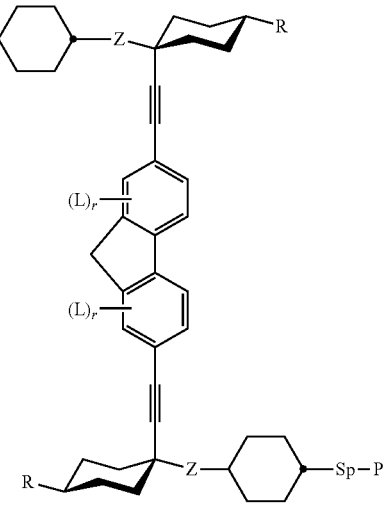
ND21
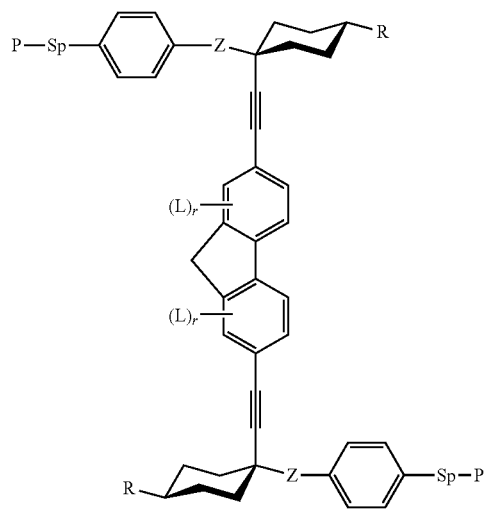
ND22
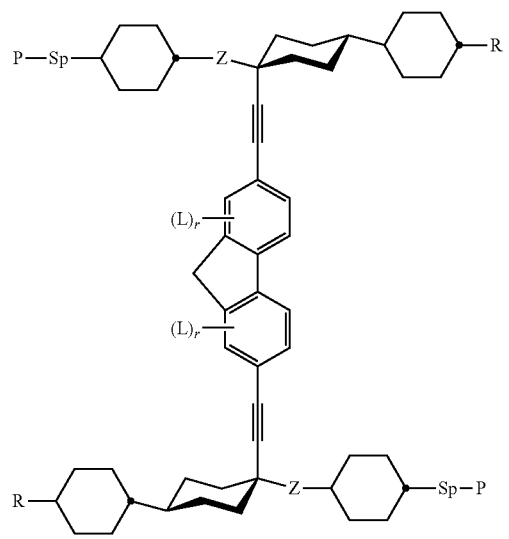
ND23

-continued
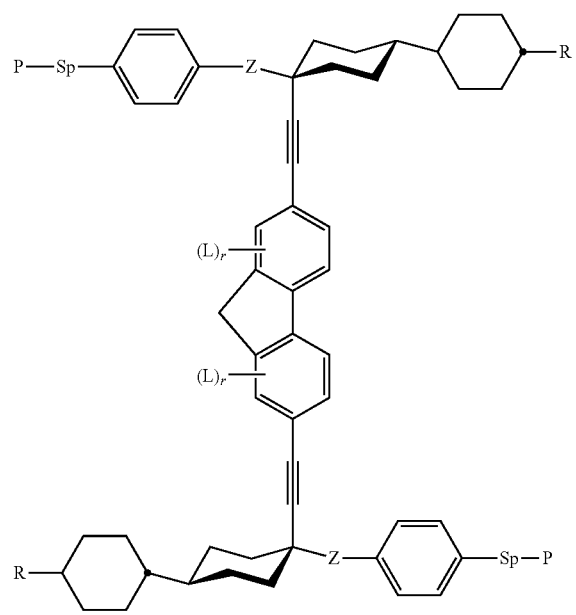
ND24
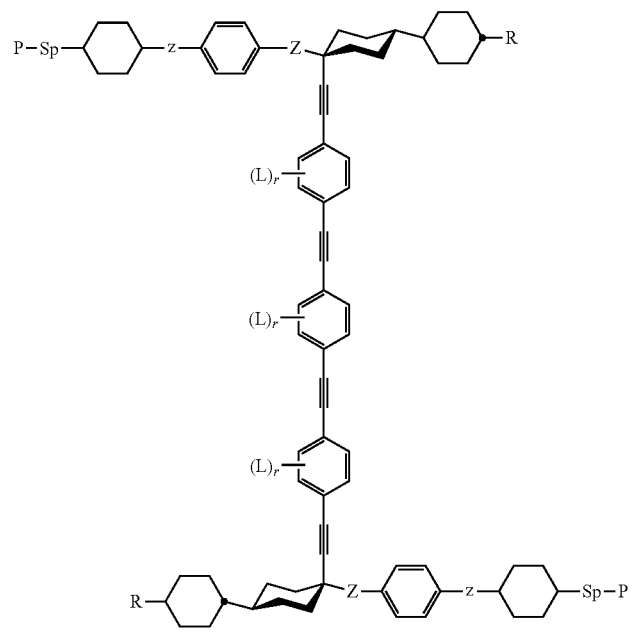
ND25

ND26

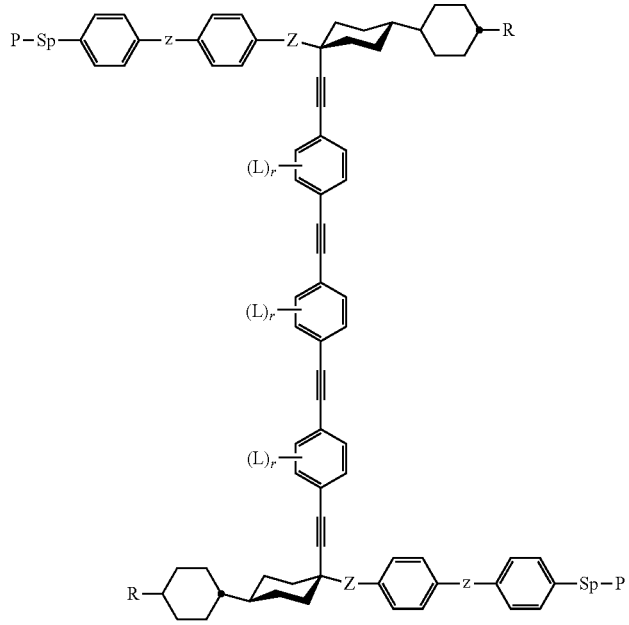

wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula ND are selected from the group of compounds of formula ND 25 or ND 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula ND, its subformulae and suitable methods for their synthesis are disclosed in WO 2008/119427 A1.

The amount of compounds of formula ND in the polymerisable LC material is preferably from 0 to 50%, very preferably from 0 to 40%.

In a further preferred embodiment the polymerisable LC material comprises optionally one or more additives selected from the group consisting of polymerisation initiators, surfactants, further stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

In another preferred embodiment, the polymerisable LC material optionally comprises one or more additives selected from polymerisable non-mesogenic compounds (reactive thinners). The amount of these additives in the polymerisable LC material is preferably from 0 to 30%, very preferably from 0 to 25%.

The reactive thinners used are not only substances which are referred to in the actual sense as reactive thinners, but also auxiliary compounds already mentioned above which contain one or more complementary reactive units, for example hydroxyl, thiol-, or amino groups, via which a reaction with the polymerisable units of the liquid-crystalline compounds can take place.

The substances, which are usually capable of photopolymerisation, include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those, which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners are polyester (meth)acrylates, which are the (meth)acrylic ester of polyesterols.

Examples of suitable polyesterols are those, which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners are furthermore 1,4-divinylbenzene, triallyl cyanurate, acrylic esters of tricyclodecenyl alcohol of the following formula

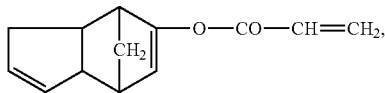 [SMILES: C=CC(=O)OC1=CC2CC1C1CC=CC21]

also known under the name dihydrodicyclopentadienyl acrylate, and the allyl esters of acrylic acid, methacrylic acid and cyanoacrylic acid.

Of the reactive thinners, which are mentioned by way of example, those containing photopolymerizable groups are used in particular and in view of the abovementioned preferred compositions.

This group includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

The group furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed above as "mixed forms".

If reactive thinners are used, their amount and properties must be matched to the respective conditions in such a way that, on the one hand, a satisfactory desired effect, for example the desired colour of the composition according to the invention, is achieved, but, on the other hand, the phase behaviour of the liquid-crystalline composition is not excessively impaired. The low-crosslinking (high-crosslinking) liquid-crystalline compositions can be prepared, for example, using corresponding reactive thinners, which have a relatively low (high) number of reactive units per molecule.

The group of diluents include, for example:

C1-C4-alcohols, for example methanol, ethanol, n-propanol, isopropanol, butanol, isobutanol, sec-butanol and, in particular, the C5-C12-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), C1-C5-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are C1-C4-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example tetrahydrofuran and dioxane, ketones, for example acetone, methyl ethyl ketone and diacetone alcohol (4-hydroxy-4-methyl-2-pentanone), and C1-C4-alkyl esters, for example methyl, ethyl, propyl and butyl acetate.

The diluents are optionally employed in a proportion of from about 0 to 10.0% by weight, preferably from about 0 to 5.0% by weight, based on the total weight of the polymerisable LC material.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) cannot strictly be delimited from one another in their action.

For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfil the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18,TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 936, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are optionally employed in a proportion of from about 0 to 3.0% by weight, preferably from about 0 to 2.0% by weight, based on the total weight of the polymerisable LC material.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGO® Rad 2700, which are likewise obtainable from TEGO.

Such-auxiliaries are also available, for example, from BYK as BYK®-300 BYK®-306, BYK®-307, BYK®-310, BYK®-320, BYK®-333, BYK®-341, Byk® 354, Byk®361, Byk®361 N, BYK®388.

Such-auxiliaries are also available, for example, from Merck KGaA as Tivida® FL 2300 and Tivida® FL 2500

The auxiliaries in group c2) are optionally employed in a proportion of from about 0 to 3.0% by weight, preferably from about 0 to 2.0% by weight, based on the total weight of the polymerisable LC material.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups, which are able to react with isocyanate groups, for example of the binder.

Examples of thermally curing auxiliaries, which can be used, are the products BYK®-370, BYK®-373 and BYK®-375 available from BYK.

The auxiliaries in group c3) are optionally employed in a proportion of from about 0 to 5.0% by weight, preferably from about 0 to 3.0% by weight, based on the total weight of the polymerisable LC material.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behaviour of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are optionally employed in a proportion of from about 0 to 3.0% by weight, preferably from about 0 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used on the mean molecular weight of the auxiliary. In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are optionally employed in a proportion of from about 0 to 5.0% by weight, preferably from about 0 to 3.0% by weight, based on the total weight of the polymerisable LC material.

Further adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pre-treated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Corresponding technical information from the manufacturers of such additives should generally be used or the person skilled in the art can obtain this information in a simple manner through corresponding preliminary experiments.

However, if these additives are to be added as auxiliaries from group c7) to the polymerisable LC materials according to the invention, their proportion optionally corresponds to from about 0 to 5.0% by weight, based on the total weight of the polymerisable LC material. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the range of amounts given for group c3) are likewise suitable, i.e. these additives are optionally employed in a proportion of from about 0 to 5.0% by weight, preferably from about 0 to 3.0% by weight, based on the total weight of the liquid-crystalline composition.

Examples that may be mentioned of light, heat and/or further oxidation stabilizers are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4- methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-di-octylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl)disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl) pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide and isooctyl-3,5-di-tert-butyl-4-hydroxybenzylmercaptoacetate, Aromatic hydroxybenzyl compounds, such as 1,3,5-tris(3,5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl) hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane and 4-hydroxymethyl-1-phospha-2,6,7-trioxabicyclo [2.2.2]-octane, Propionamides based on amine derivatives, such as N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphines, Phosphites and phosphonites, such as triphenylphosnine triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl) benzotriazole, 2-(3'-dodecyl-2'-hydroxy-5'-methylphenyl) benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300; [R—CH2CH2-COO(CH2)3□2, where R=3'-tert-butyl-4'-hydroxy-5'-2H-benzotriazol-2-ylphenyl], Sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, diocta-decyl disulfide and pentaerythritol tetrakis(β-dodecylmercapto)propionate, 2-Hydroxybenzophenones, such as the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In another preferred embodiment, the polymerisable LC material comprises one or more specific antioxidant additives, preferably from the Irganox® series available from Ciba, Switzerland, such as Irganox®1010, Irganox®1076.

Polymerisation of the RMs is preferably carried out in the presence of a combination of photoinitiators. For this purpose, preferably the polymerisable LC material contains optionally to one or more carbazole oxime ester photoinitiator, also one or more type of polymerisation initiators, which are commonly known to the skilled person. In this regard, typical radical photoinitiators are selected from, for example the commercially available Irgacure® or Darocure® series (Ciba AG), for example Irgacure 127, Irgacure 184, Irgacure 369, Irgacure 651, Irgacure 817, Irgacure 907, Irgacure 1300, Irgacure, Irgacure 2022, Irgacure 2100, Irgacure 2959, or Darcure TPO.

The concentration of these additional photoinitiators as a whole in the polymerisable LC material is preferably from 0 to 10%, very preferably from 0 to 8%, more preferably 0 to 5%.

Preferably, the polymerisable LC material comprises besides one or more carbazole oxime ester photoinitiators, andone or more di- or multireactive polymerisable mesogenic compounds of formula I, andone or more mono-, di- or multireactive polymerisable mesogenic compounds of formula II, i. optionally one or more antioxidative additives,
ii. optionally one or more mono-, di- or multireactive polymerisable mesogenic compounds of formula RM,
iii. optionally one or more compounds of formula ND,
iv. optionally one or more photoinitiators,
v. optionally one or more adhesion promotors,
vi. optionally one or more surfactants,
vii. optionally one or more stabilizers,
viii. optionally one or more mono-, di- or multireactive polymerisable non-mesogenic compounds,
ix. optionally one or more dyes showing an absorption maximum at the wavelength used to initiate photo polymerisation,
x. optionally one or more chain transfer agents,
xi. optionally one or more stabilizers,
xii. optionally one or more lubricants and flow auxiliaries, and/or
xiii. optionally one or more diluents.

More preferably, the polymerisable LC material comprises besides one or more carbazole oxime ester photoinitiators, preferably selected from CO-6, more preferably CO-11, even more preferably from CO-14, especially from CO-17 and/or CO-18, preferably in an amount of 1% to 5% by weight, more preferably in an amount of 1.5% to 4% by weight, especially in an amount of 2% to 3% by weight, and one or more, preferably two or more, direactive polymerisable mesogenic compounds of formula I, preferably in an amount of 10 to 90% by weight, very preferably 15 to 75% by weight, preferably selected from the compounds of formula I-2b1, and/or I-2b-2, and/or I-3a-1, more preferably selected from compounds of formula I-2b-1, and one or more, preferably two or more, monoreactive polymerisable mesogenic compounds of formula II, preferably in an amount of 10 to 95% by weight, very preferably 25 to 85%, preferably selected from compounds of formulae II-1a-1, and/or II-2a-II, and/or II-3a-1, more preferably selected from compounds of formula II-1a-1 and/or II-2a-1, a) optionally one or more, preferably two or more, compounds of formula ND, and if present, preferably in an amount of 10 to 90% by weight, very preferably 15 to 40% by weight, preferably selected from the compounds of formula ND-25 and/or ND-26,
b) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight,
c) optionally one or more further photoinitiators, preferably selected from Irgacure®651, and/or Irgacure®907, preferably in an amount of 0.1 to 10% by weight, very preferably 0.5 to 8% by weight,
d) optionally one or more lubricants and flow auxiliaries, preferably selected from BYK®388, and if present, preferably in an amount of 0 to 5% by weight, very preferably 0.1 to 3% by weight, and/or
e) optionally one or more diluents, preferably selected from n-dodecanol, in if present, preferably in an amount of 0 to 5% by weight, very preferably 0.1 to 3% by weight.

In another preferred embodiment, especially for homeotropic aligned polymer films having positive dispersion, the polymerisable LC material consists of one or more carbazole oxime ester photoinitiators, preferably selected from CO-6, more preferably CO-11, even more preferably from CO-14, especially from CO-17 and/or CO-18, preferably in an amount of 1% to 5% by weight, more preferably in an amount of 1.5% to 4% by weight, especially in an amount of 2% to 3% by weight, and one or more, preferably two or more, direactive polymerisable mesogenic compounds of formula I, preferably in an amount of 10 to 90% by weight, very preferably 15 to 75% by weight, preferably selected from the compounds of formula I-2b1, and/or I-2b-2, and/or I-3a-1, more preferably selected from compounds of formula I-2b-1, and one or more, preferably two or more, monoreactive polymerisable mesogenic compounds of formula II, preferably in an amount of 10 to 95% by weight, very preferably 25 to 85%, preferably selected from compounds of formulae II-1a-1, and/or II-2a-11, and/or II-3a-1, more preferably selected from compounds of formula II-1a-1 and/or II-2a-1, a) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight, b) optionally one or more photoinitiators, preferably selected from Irgacure®651, and/or Irgacure®907, and if present, preferably in an amount of 0.1 to 10% by weight, very preferably 0.5 to 8% by weight, and/or c) optionally one or more diluents, preferably selected from n-dodecanol, in if present, preferably in an amount of 0 to 5% by weight, very preferably 0.1 to 3% by weight.

In another preferred embodiment, especially for polymer films having negative dispersion, the polymerisable LC material consists of one or more carbazole oxime ester photoinitiators, preferably selected from CO-6, more preferably CO-11, even more preferably from CO-14, especially from CO-17 and/or CO-18, preferably in an amount of 1% to 5% by weight, more preferably in an amount of 1.5% to 4% by weight, especially in an amount of 2% to 3% by weight, and one or more, preferably two or more, direactive polymerisable mesogenic compounds of formula I, preferably in an amount of 10 to 90% by weight, very preferably 15 to 75% by weight, preferably selected from the compounds of formula I-2b1, and/or I-2b-2, and/or I-3a-1, more preferably selected from compounds of formula I-2b-2, and/or I-3a-1, and one or more monoreactive polymerisable mesogenic compounds of formula II, preferably in an amount of 10 to 50% by weight, very preferably 25 to 40%, preferably selected from compounds of formula II-2a-1, and one or more compounds of formula ND, preferably and if present, preferably in an amount of 10 to 90% by weight, very preferably 15 to 40% by weight, preferably selected from the compounds of formula ND-25 and/or ND-26, a) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight, and/or b) optionally one or more photoinitiators, preferably selected from Irgacure®651, and/or Irgacure®907, preferably in an amount of 0.1 to 10% by weight, very preferably 0.5 to 8% by weight.

In another preferred embodiment, especially for planar aligned polymer films, the polymerisable LC material consists of one or more carbazole oxime ester photoinitiators, preferably selected from CO-6, more preferably CO-11, even more preferably from CO-14, especially from CO-17 and/or CO-18, preferably in an amount of 1% to 5% by weight, more preferably in an amount of 1.5% to 4% by weight, especially in an amount of 2% to 3% by weight, and one or more, preferably two or more, direactive polymerisable mesogenic compounds of formula I, preferably in an amount of 10 to 90% by weight, very preferably 15 to 75% by weight, preferably selected from the compounds of formula I-2b1, and/or I-2b-2, and one or more monoreactive polymerisable mesogenic compounds of formula II, preferably in an amount of 10 to 50% by weight, very preferably 25 to 40%, preferably selected from compounds of formulae II-1a-1, a) optionally one or more antioxidative additives, preferably selected from esters of unsubstituted and substituted benzoic acids, in particular Irganox®1076, and if present, preferably in an amount of 0.01 to 2% by weight, very preferably 0.05 to 1% by weight, and/or b) optionally one or more lubricants and flow auxiliaries, preferably selected from BYK®388, and if present, preferably in an amount of 0 to 5% by weight, very preferably 0.1 to 3% by weight.

The invention further relates to a method of preparing a polymer film by providing a layer of a polymerisable LC material as described above and below onto a substrate, polymerising the polymerisable LC material, and optionally removing the polymerised LC material from the substrate and/or optionally providing it onto another substrate.

It is also possible, for example for preparation, to dissolve the polymerisable LC material in a suitable solvent.

In another preferred embodiment, the polymerisable LC material comprises one or more solvents, which are preferably selected from organic solvents. The solvents are preferably selected from ketones such as acetone, methyl ethyl ketone, methyl propyl ketone, methyl isobutyl ketone or cyclohexanone; acetates such as methyl, ethyl or butyl acetate or methyl acetoacetate; alcohols such as methanol, ethanol or isopropyl alcohol; aromatic solvents such as toluene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone. It is also possible to use binary, ternary or higher mixtures of the above solvents.

In case the polymerisable LC material contains one or more solvents, the total concentration of all solids, including the RMs, in the solvent(s) is preferably from 10 to 60%.

For preparing polymer films, this solution is then coated or printed onto the substrate, for example by spin-coating, printing, or other known techniques, and the solvent is evaporated off before polymerisation. In most cases, it is suitable to heat the mixture in order to facilitate the evaporation of the solvent.

The polymerisable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable plastic substrates are known to the expert and described in the literature, as for example conventional substrates used in the optical films industry. Especially suitable and preferred substrates for polymerisation are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials.

The polymerisable LC material preferably exhibits a uniform alignment throughout the whole layer. Preferably the polymerisable LC material exhibits planar or a homeotropic alignment. The Friedel-Creagh-Kmetz rule can be used to predict whether a mixture will adopt planar or homeotropic alignment, by comparing the surface energies ($\gamma$) of the RM layer and the substrate:

If $\gamma_{RM} > \gamma_s$ the reactive mesogenic compounds will display homeotropic alignment, If $\gamma_{RM} < \gamma_s$ the reactive mesogenic compounds will display homeotropic alignment.

When the surface energy of a substrate is relatively low, the intermolecular forces between the reactive mesogens are stronger than the forces across the RM-substrate interface.

Therefore, reactive mesogens align perpendicular to the substrate (homeotropic alignment) in order to maximise the intermolecular forces.

Homeotropic alignment can also be achieved by using amphiphilic materials; they can be added directly to the polymerisable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate.

One way planar alignment can be promoted is by coating the substrate with a polyimide layer, and then rubbing the alignment layer with a velvet cloth.

Other suitable alignment layers are known in the art, like for example rubbed polyimide or alignment layers prepared by photoalignment as described in U.S. Pat. No. 5,602,661, 5,389,698 or 6,717,644.

In general, reviews of alignment techniques, which can be used to align layer of the polymerisable LC material, are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

For the production of the polymer films according to the invention, the polymerisable compounds in the polymerisable LC material are polymerised or crosslinked (if one compound contains two or more polymerisable groups) by in-situ polymerisation.

The polymerisation can be carried out in one-step. It is also possible to polymerise or crosslink the compounds in a second step, which have not reacted in the first step ("end curing").

In a preferred method of preparation, the polymerisable LC material is coated onto a substrate and subsequently polymerised for example by exposure to heat or actinic radiation as described for example in WO 01/20394, GB 2,315,072 or WO 98/04651.

Polymerisation of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerisation is carried out by photo irradiation, in particular with UV light. As a source for actinic radiation, for example a single UV lamp or a set of UV lamps can be used. When using a high lamp power the curing time can be reduced. Another possible source for photo radiation is a laser, like e.g. a UV laser, an IR laser, or a visible laser.

The curing time is dependent, inter alia, on the reactivity of the polymerisable LC material, the thickness of the coated layer, the type of polymerisation initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm-2, more preferably in the range from 50 to 175 mWcm$^{-2}$ and most preferably in the range from 100 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Polymerisation is preferably performed under an inert gas atmosphere, preferably in a heated nitrogen atmosphere, but also polymerisation in air is possible.

Polymerisation is preferably performed at a temperature from 1 to 70° C., more preferably 5 to 50° C., even more preferably 15 to 30° C.

The polymerised LC film according to the present invention has good adhesion to plastic substrates, in particular to TAC, COP, and colour filters. Accordingly, it can be used as adhesive or base coating for subsequent LC layers which otherwise would not well adhere to the substrates.

The preferred thickness of a polymerised LC film according to the present invention is determined by the optical properties desired from the film or the final product. For example, if the polymerised LC film does not mainly act as an optical layer, but e.g. as adhesive, aligning or protection layer, its thickness is preferably not greater than 1 μm, in particular not greater than 0.5 μm, very preferably not greater than 0.2 μm.

For example, uniformly homeotropic or planar aligned polymer films of the present invention can be used as retardation or compensation film for example in LCDs to improve the contrast and brightness at large viewing angles and reduce the chromaticity. They can be used outside the switchable liquid-crystalline cell in an LCD, or between the substrates, usually glass substrates, forming the switchable liquid-crystalline cell and containing the switchable liquid-crystalline medium (in cell application).

For optical applications of the polymer film, it preferably has a thickness of from 0.5 to 10 μm, very preferably from 0.5 to 5 μm, in particular from 0.5 to 3 μm.

The optical retardation ($\delta(\lambda)$) of a polymer film as a function of the wavelength of the incident beam ($\lambda$) is given by the following equation (7):

$$\delta(\lambda)=(2\pi\Delta n \cdot d)/\lambda \qquad (7)$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n = \sin \Theta / \sin \Psi \qquad (8)$$

wherein sin $\Theta$ is the incidence angle or the tilt angle of the optical axis in the film and sin $\Psi$ is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The birefringence (Δn) of the polymer film according to the present invention is preferably in the range from 0.01 to 0.30, more preferable in the range from 0.01 to 0.25 and even more preferable in the range from 0.01 to 0.16.

The optical retardation as a function of the thickness of the polymer film according to the present invention is preferably less than 200 nm, more preferable less than 180 nm and even more preferable less than 150 nm.

Especially with regard to the in cell application, the polymer films according to the present invention exhibit a high temperature stability. Thus, the polymer films exhibit temperature stability up to 300° C., preferably up to 250° C., more preferably up to 230° C.

The polymer film of the present invention can also be used as alignment film for other liquid-crystalline or RM materials. For example, they can be used in an LCD to induce or improve alignment of the switchable liquid-crystalline medium, or to align a subsequent layer of polymerisable LC material coated thereon. In this way, stacks of polymerised LC films can be prepared.

In summary, the polymerised LC films and polymerisable LC materials according to the present invention are useful in optical elements like polarisers, compensators, alignment layer, circular polarisers or colour filters in liquid crystal displays or projection systems, decorative images, for the preparation of liquid crystal or effect pigments, and especially in reflective films with spatially varying reflection colours, e.g. as multicolour image for decorative, information storage or security uses, such as non-forgeable documents like identity or credit cards, banknotes etc.

The polymerised LC films according to the present invention can be used in displays of the transmissive or reflective type. They can be used in conventional OLED displays or LCDs, in particular LCDs of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R—OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays. Especially preferred are VA, MVA, PVA, OCB, and pi-cell displays.

The polymerisable material and polymer films according to the present invention are especially useful for a 3D display as described in EP 0 829 744, EP 0 887 666 A2, EP 0 887 692, U.S. Pat. Nos. 6,046,849, 6,437,915 and in "Proceedings o the SID 20$^{th}$ International Display Research Conference, 2000", page 280. A 3D display of this type comprising a polymer film according to the invention is another object of the present invention.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout this application, unless explicitly stated otherwise, all concentrations are given in weight percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

The examples below serve to illustrate the invention without limiting it.

EXAMPLES

For the following examples, the following RMs are utilized:

| RM | No. |
|---|---|
|  | 1 |
|  | 2 |
|  | 3 |
| 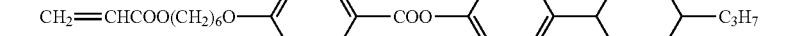 | 4 |
|  | 5 |
|  | 6 |
|  | 7 |
| 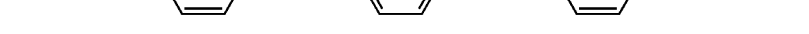 | 8 |

Example 1

The following host mixture H-1 is prepared.

| Compound | Conc. %-w/w |
|---|---|
| 1 | 19.28 |
| 3 | 33.75 |
| 4 | 21.69 |
| 5 | 21.69 |
| Irganox ®1076 | 0.08 |
| n-Dodecanol | 1.02 |
| Photoinitiator | 2.50 |

Irganox1076 ® is a stabilizer, being commercially available (Ciba AG, Basel, Switzerland).

The testing mixtures are prepared by doping 2.5% of different photoinitiators (cf. Table 1) into a bulk of the above described host mixture H-1. In each case, the mixtures are dissolved in the range of 26% solids in methyl ethyl ketone/methyl isobutyl ketone/cyclohexanone (1:1:1). Each material is spin coated on raw glass as substrate with 1000 rpm for 30 sec. The coated films are then annealed to the substrate at an elevated temperature of 50° C. for 1 minute and cured in static fusion H bulb under a $N_2$-atmosphere (150 mW for 1.8 s), respectively.

Each film is laminated to TAC using a pressure sensitive adhesive so the total film stack is glass/polymer film/pressure sensitive adhesive/TAC and these films are subjected to the durability experiment.

To measure the retardation of each cured film, a Caryseclipse ellipsometer is used. Retardation is analysed at an angle of +40°, using a light source with a wavelength of 550 nm. Each film is then placed in an oven at 85° C. for a total time of 24 h. After 24 h, the film is taken out of the oven and cooled to room temperature before recording the retardation profile again. The durability $\Delta R_{40}$ [%] is quantified by the difference in $R_{40}$ before and after the oven test. Three films of each mixture are produced and treated in identical conditions during each experiment to pinpoint and minimise erroneous results. The results are summarized in the following table 1:

TABLE 1

Durability data

| No. | Mixture | 0 h $R_{40}$ | 24 h $R_{40}$ | $\Delta R_{40}$ [%] | $\Delta R_{40\ av.}$ [%] |
|---|---|---|---|---|---|
| CM1 | Host + 2.5% Irgacure 127* | 46.32 | 30.89 | 33.3 | 33.7 |
| | | 47.04 | 30.64 | 34.9 | |
| | | 46.61 | 31.23 | 33.0 | |
| CM2 | Host + 2.5% Irgacure 184* | 46.54 | 34.68 | 25.5 | 26.9 |
| | | 45.39 | 32.49 | 28.4 | |
| | | 45.79 | 33.56 | 26.7 | |
| CM3 | Host + 2.5% Irgacure 379* | 47.17 | 33.65 | 28.7 | 29.2 |
| | | 46.81 | 32.56 | 30.4 | |
| | | 46.72 | 33.37 | 28.6 | |
| CM4 | Host + 2.5% Irgacure 1800* | 45.75 | 34.89 | 23.7 | 25.5 |
| | | 45.37 | 33.44 | 26.3 | |
| | | 45.61 | 33.53 | 26.5 | |
| CM5 | Host + 2.5% Irgacure 1870* | 45.63 | 34.89 | 23.5 | 25.8 |
| | | 45.92 | 33.47 | 27.1 | |
| | | 47.96 | 35.09 | 26.8 | |
| CM6 | Host + 2.5% Irgacure 2959* | 46.55 | 36.47 | 21.7 | 22.6 |
| | | 47.74 | 36.70 | 23.1 | |
| | | 46.24 | 35.53 | 23.2 | |
| CM7 | Host + 2.5% Irgacure 500* | 44.79 | 33.99 | 24.1 | 23.2 |
| | | 47.41 | 40.00 | 15.6 | |
| | | 46.09 | 32.30 | 29.9 | |
| CM8 | Host + 2.5% Irgacure 2022* | 46.55 | 35.49 | 23.8 | 26.2 |
| | | 46.18 | 32.81 | 29.0 | |
| | | 50.32 | 37.26 | 26.0 | |
| CM9 | Host + 2.5% Lucirin TPO* | 47.21 | 42.04 | 11.0 | 21.0 |
| | | 46.51 | 34.70 | 25.4 | |
| | | 47.27 | 34.61 | 26.8 | |

TABLE 1-continued

Durability data

| No. | Mixture | 0 h $R_{40}$ | 24 h $R_{40}$ | $\Delta R_{40}$ [%] | $\Delta R_{40\ av.}$ [%] |
|---|---|---|---|---|---|
| CM10 | Host + 2.5% Irgacure 369* | 46.46 | 35.02 | 24.6 | 27.0 |
| | | 48.44 | 34.08 | 29.6 | |
| | | 47.22 | 34.55 | 26.8 | |
| CM11 | Host + 2.5% Irgacure 819* | 45.41 | 35.01 | 22.9 | 25.2 |
| | | 45.86 | 33.70 | 26.5 | |
| | | 48.58 | 35.86 | 26.2 | |
| M1 | Host + 2.5% Oxe 02** | 44.37 | 42.65 | 3.9 | 3.3 |
| | | 43.26 | 41.95 | 3.0 | |
| | | 43.74 | 42.37 | 3.1 | |

*Comparative example
**Oxe02 is a compound of formula CO-17 according to the present invention, commercially available from Ciba.

All polymer films exhibit a uniform homeotropic alignment, while being checked between crossed polarizers. In contrast to the comparative examples of CM1 to CM11, the example of M1 in accordance with the present invention, i.e., with a carbazole oxime ester photoinitiator shows a significantly increased durability.

Example 2

The following mixture M2 is prepared.

| Compound | Conc. %-w/w |
|---|---|
| 1 | 19.18 |
| 3 | 33.58 |
| 4 | 21.57 |
| 5 | 21.57 |
| Irganox ®1076 | 0.08 |
| n-Dodecanol | 1.02 |
| Compound CO-18 | 3.00 |

Irganox1076® is a stabilizer, being commercially available (Ciba AG, Basel, Switzerland). N1919T is a compound of formula CO-18 according to the present invention, commercially available from Adeka.

The mixtures is dissolved in the range of 26% solids in methyl ethyl ketone/methyl isobutyl ketone/cyclohexanone (1:1:1).

The resulting material is spin coated on raw glass as substrate with 1000 rpm for 30 s. The coated films are then annealed to the substrate at an elevated temperature of 50° C. for 1 minute and cured in static fusion H bulb under a $N_2$-atmosphere (150 mW for 1.8 s).

The resulting polymer film exhibits a uniform homeotropic alignment, while being checked between crossed polarizers and a comparable durability to example of M1.

Example 3

The following mixture M3 is prepared.

| Compound | Conc. %-w/w |
|---|---|
| 1 | 18.38 |
| 3 | 44.38 |
| 4 | 14.58 |
| 5 | 14.58 |
| Irganox ®1076 | 0.08 |
| n-Dodecanol | 1.02 |
| Compound CO-18 | 3.00 |

Irganox1076® is a stabilizer, being commercially available (Ciba AG, Basel, Switzerland). N1919T is a compound of formula CO-18 according to the present invention, commercially available from Adeka.

The mixtures is dissolved in the range of 26% solids in methyl ethyl ketone/methyl isobutyl ketone/cyclohexanone (1:1:1).

The resulting material is spin coated on raw glass as substrate with 1000 rpm for 30 s. The coated films are then annealed to the substrate at an elevated temperature of 50° C. for 1 minute and cured in static fusion H bulb under a $N_2$-atmosphere (150 mW for 1.8 s).

The resulting polymer film exhibits a uniform homeotropic alignment, while being checked between crossed polarizers and a comparable durability to example of M1.

Examples 4 and 5

The following mixtures CM 12 and CM 13 are prepared.

| Compound | Conc. %-w/w |
| --- | --- |
| CM12 | |
| 1 | 23.90 |
| 3 | 39.80 |
| 4 | 14.80 |
| 5 | 14.80 |
| Irganox ®1076 | 0.08 |
| n-Dodecanol | 1.02 |
| Irgacure ®907 | 4.60 |
| Irgacure ®651 | 1.00 |
| CM13 | |
| 1 | 17.86 |
| 3 | 43.12 |
| 4 | 14.17 |
| 5 | 14.17 |
| Irganox ®1076 | 0.08 |
| n-Dodecanol | 5.00 |
| Irgacure ®907 | 4.60 |
| Irgacure ®651 | 1.00 |

Irganox1076 ® is a stabilizer, Irgacure ®907 and Irgacure ®651 are photoinitiators all being commercially available (Ciba AG, Basel, Switzerland). To the bulk mixtures CM12 and CM13, 1% of a compound of formula CO-17 (Oxe02, commercially available from Ciba AG) are added resulting in mixture M4 and M5, respectively.

The mixtures are each dissolved in the range of 26% solids in methyl ethyl ketone/methyl isobutyl ketone/cyclohexanone (1:1:1).

The resulting materials are bar coated on a COP substrate using Meyer bar 3, annealed to the substrate at room temperature for 2 minutes and cured in static fusion H bulb under a $N_2$-atmosphere (150 mW for 1.8 s), respectively.

The haze level of each polymer film is directly measured using a Shimatsu 3600 UV-Vis-IR spectrophotometer. The haze level is defined using the following equation:

Haze level=(100*(%$T$ (diffuse))/(%$T$ (total)))−
% Haze of COP Substrate

The results are summarized in table 2:

TABLE 2

| Haze level of polymer films | | |
| --- | --- | --- |
| Film | Haze level in % | Minus COP Baseline |
| COP | 0.246 | 0.000 |
| CM12* | 0.622 | 0.377 |

TABLE 2-continued

| Haze level of polymer films | | |
| --- | --- | --- |
| Film | Haze level in % | Minus COP Baseline |
| M4** | 0.342 | 0.096 |
| CM13* | 0.442 | 0.196 |
| M5** | 0.360 | 0.114 |

*Comparative example with commercially available photoinitiators Irgacure ®907 and Irgacure ®651
**Working example with a combination commercially available photoinitiators Irgacure ®907 and Irgacure ®651 and a compound of formula CO-17 (Oxe02, commercially available from Ciba AG, Basel, Switzerland).

All polymer films exhibit a uniform homeotropic alignment, while being checked between crossed polarizers. In contrast to the comparative examples CM 12 and CM 13, the examples M4 and M5 in accordance with the present invention each show a significantly decreased haze level.

Each polymer film is then laminated to a pressure sensitive adhesive and left with an open surface so the total film stack is COP/polymer film/pressure sensitive adhesive. These films are subjected to the durability experiment as given under example 1. The results are summarized in table 3:

TABLE 3

| Durability data | | | |
| --- | --- | --- | --- |
| Mixture | 0 h $R_{40}$ | 24 h $R_{40}$ | $\Delta R_{40}$ [%] |
| CM12* | 23.53 | 21.39 | 9.1 |
| M4** | 26.48 | 25.93 | 2.1 |
| CM13* | 20.50 | 17.92 | 12.6 |
| M5** | 21.80 | 21.28 | 2.4 |

*Comparative example with commercially available photoinitiators Irgacure ®907 and Irgacure ®651
**Working example with a combination commercially available photoinitiators Irgacure ®907 and Irgacure ®651 and a compound of formula CO-17 (Oxe02, commercially available from Ciba AG, Basel, Switzerland).

In contrast to the comparative example of CM 12 and CM 13, the examples of M4 and M5 in accordance with the present invention each show a significantly increased durability.

Examples 5 and 6

The mixtures CM12, CM 13, M4 and M5 are dissolved in the range of 26% solids in methyl ethyl ketone/methyl isobutyl ketone/cyclohexanone (1:1:1).

The resulting materials are spin coated on raw glass as substrate with 1000 rpm for 30 sec. The coated films are then annealed to the substrate at different temperatures (cf. Table 4) for 1 minute and cured in static fusion H bulb under a $N_2$-atmosphere (150 mW for 1.8 s).

All polymer films exhibit a uniform homeotropic alignment, while being checked between crossed polarizers.

From each polymer film, the surface roughness is determined by the following procedure. The surface roughness ($R_z$) is measured using a Dektak Profilometer. $R_z$ is a measure of the roughness of the surface of the film and it is defined by the average deviation from flat from the highest five peaks and lowest five valleys. The $R_z$ is measured for each film for a 0.5 $mm^2$ area on the film surface using the profilometer. The results are summarized in table 4:

TABLE 4

Surface roughness data

| Annealing Temp. | Rz | Annealing Temp. | Rz |
|---|---|---|---|
| CM 12* | | M4** | |
| 20° C. | 676.22 | 20° C. | 27.11 |
| 40° C. | 183.23 | 40° C. | 40.20 |
| 60° C. | 18.16 | 60° C. | 20.07 |
| 80° C. | 35.08 | 80° C. | 15.27 |
| 100° C. | 29.65 | 100° C. | 26.66 |
| 120° C. | 62.76 | 120° C. | 31.71 |
| CM 13* | | M5** | |
| 20° C. | 158.1 | 20° C. | 40.22 |
| 40° C. | 100.61 | 40° C. | 33.02 |
| 60° C. | 82.66 | 60° C. | 23.35 |
| 80° C. | 38.46 | 80° C. | 13.16 |
| 100° C. | 36.09 | 100° C. | 18.08 |
| 120° C. | 62.06 | 120° C. | 26.48 |

*Comparative example with commercially available photoinitiators Irgacure ®907 and Irgacure ®651
**Working example with a combination of commercially available photoinitiators Irgacure ®907 and Irgacure ®651 and a compound of formula CO-17 (Oxe02, commercially available from Ciba AG, Basel, Switzerland).

In comparison to polymer films obtained from comparative mixtures CM 12 and CM 13, the polymer films obtained from mixtures M4 and M5 in accordance with the present invention each exhibit a significantly decreased surface roughness.

Example 7

The following mixtures CM14 and M6 are prepared.

| Compound | Conc. %-w/w |
|---|---|
| CM 14 | |
| 1 | 28.89 |
| 4 | 54.89 |
| 5 | 13.72 |
| BYK ®388 | 0.50 |
| Irgacure ®907 | 5.00 |
| M6 | |
| 1 | 28.89 |
| 4 | 54.89 |
| 5 | 13.72 |
| BYK ®388 | 0.50 |
| Compound CO-17 (Oxe02) | 5.00 |

BYK ®388 is a commercially available levelling agent (BYK, Wesel, Germany).

The mixtures CM 14 and M6 each are dissolved in the range of 26% solids in toluene/cyclohexanone (1:1).

The resulting materials bar coated on rubbed TAC as substrate using a Meyer bar 3. The coated films are then annealed to the substrate at 60° C. for 1 minute and cured in static fusion H bulb under a $N_2$-atmosphere (150 mW for 1.8 s).

All polymer films exhibit a uniform planar alignment, while being checked between crossed polarizers.

Each film is laminated to raw glass using a pressure sensitive adhesive so the total film stack is TAC/polymer film/pressure sensitive adhesive/glass.

To measure the retardation ($R_0$) of each cured film, a Carys-eclipse ellipsometer is used. Retardation is analysed at an angle of +0°, using a light source with a wavelength of 550 nm. Each film is then placed in an oven at 85° C. for a total time of 24 h. After 24 h, the film is taken out of the oven and cooled to room temperature before recording the retardation profile again. The durability $\Delta R_0$ [%] is quantified by the difference in $R_0$ before and after the oven test. The results are summarized in the following table 5:

TABLE 5

Durability data of planar aligned films

| Mixture | 0 h $R_0$ | 24 h $R_0$ | $\Delta R_0$ [%] |
|---|---|---|---|
| CM 14* | 130.70 | 125.90 | 3.7 |
| M6** | 130.04 | 127.20 | 2.2 |

*Comparative example with commercially available photoinitiator Irgacure ®907 Ciba AG, Basel, Switzerland.
**Working example with compound of formula CO-17 (Oxe02, commercially available from Ciba AG, Basel, Switzerland).

In contrast to the comparative example of CM 14, the example of M6 in accordance with the present invention shows a significantly increased durability.

Example 8

The following mixture is prepared.

| Compound | Conc. %-w/w |
|---|---|
| 3 | 27.00 |
| 6 | 14.00 |
| 7 | 26.50 |
| 8 | 30.00 |
| Photoinitiator | 2.50 |

The testing mixtures are prepared by doping 2.5% of Irgacure®907 or compound CO-17 (Oxe02) into a bulk of the above described host mixture resulting in mixture CM15 comprising Irgacure®907 and M7 comprising compound CO-17. Each mixture is then bar coated on COP using a Meyer bar 4. The coated films are then annealed to the substrate at an elevated temperature of 60° C. for 1 minute and cured in static fusion H bulb under a $N_2$-atmosphere (150 mW for 1.8 s), respectively.

Both polymer films exhibit a uniform homeotropic alignment, while being checked between crossed polarizers.

Each film is laminated to raw glass using a pressure sensitive adhesive so the total film stack is COP/polymer film/pressure sensitive adhesive/raw glass and these films are subjected to the durability experiment.

To measure the retardation ($R_{40}$) of each cured film, a Carys-eclipse ellipsometer is used. $R_{40}$ is analysed using a light source with a wavelength of 550 nm at an angle of 40°. To determine the retardation dispersion $R_{40\text{-}450}/R_{40\text{-}550}$, the retardation of the material is measured at wavelengths of 450 nm and 550 nm at an angle of 40°. Each film is then placed in an oven at 85° C. for a total time of 24 h. After 24 h, the film is taken out of the oven and cooled to room temperature before recording the retardation profiles again. The durability is quantified by the difference in $R_{40}$ and $R_{40\text{-}450}/R_{40\text{-}550}$ before and after the oven test. The results are summarized in the following table 6:

TABLE 6

Durability data

| Mix. | 0 h $R_{40}$ | 24 h $R_{40}$ | $\Delta R_{40}$ [%] | 0 h $R_{40\text{-}450}/R_{40\text{-}550}$ | 24 h $R_{40\text{-}450}/R_{40\text{-}550}$ | $\Delta R_{40\text{-}450}/R_{40\text{-}550}$ [%] |
|---|---|---|---|---|---|---|
| CM15* | 13.59 | 11.63 | 14.4 | 0.90 | 0.87 | 3.3 |
| M7** | 12.80 | 11.54 | 9.8 | 0.86 | 0.86 | 0 |

*Comparative example with commercially available photoinitiator Irgacure ® 907, Ciba AG, Basel, Switzerland
**Working example with compound of formula CO-17 (Oxe02, commercially available from Ciba AG, Basel, Switzerland).

In contrast to the comparative example of CM 15, the example of M7 in accordance with the present invention shows a significantly increased durability with respect to both, the drop in $R_{40}$ and $R_{40\text{-}450}/R_{40\text{-}550}$.

Example 9

The following mixture M8 is prepared.

| Compound | Conc. %-w/w |
|---|---|
| 3 | 30.03. |
| 4 | 4.75 |
| 6 | 16.21 |
| 7 | 19.52 |
| 8 | 26.37 |
| Irganox ®1076 | 0.12 |
| CO-18 | 0.12 |

A 33.3% solution of mixture M8 in Toluene/Cyclohexane (7:3) is prepared. The test mixture is spin coated on a glass substrate, which is covered with a rubbed polyimide alignment layer with 1500 rpm for 30 sec at 20° C. The coated film is annealed at an elevated temperature of 68° C. for 1 minute and cooled down to room temperature under a $N_2$-atmosphere. The annealed film is then cured with UV light of 365 nm under a $N_2$-atmosphere (80 mW for 60 s).

The polymer films exhibit a uniform planar alignment, while being checked between crossed polarizers and a good durability of $R_{40}$ and retardation dispersion ($R_{0\text{-}450}/R_{0\text{-}550}$).

Example 10

The following host mixture H-2 is prepared.

| Compound | Conc. %-w/w |
|---|---|
| 3 | 18.91 |
| 6 | 16.08 |
| 7 | 29.47 |
| 8 | 34.00 |
| Fluor N561 | 0.42 |
| Irganox ®1076 | 0.12 |
| Photoinitiator | 1.00 |

FluorN 561 is a 100% solids, non-reactive, high fluorine content, ethylene glycol based polymeric fluorosurfactant commercially available from Cytonix.

The testing mixtures (cf. table 7) are prepared by doping 1% of a corresponding photoinitiator into a bulk of the above described host mixture H-2, and a 33.3% solution of each test mixture in Toluene/Cyclohexane (7:3) is prepared. Each test mixture is spin coated on a glass substrate, which is covered with a rubbed polyimide alignment layer with 1500 rpm for 30 sec at 20° C. The coated films are annealed at an elevated temperature of 68° C. for 1 minute and cooled down to room temperature under a $N_2$-atmosphere. The annealed film is then cured with UV light of 365 nm under a $N_2$-atmosphere (80 mW for 60 s).

All polymer films exhibit a uniform planar alignment, while being checked between crossed polarizers.

To measure the retardation ($R_0$) of each polymer film, a Carys-eclipse ellipsometer is used. The retardation is analysed at angle of 0° using a light source with a wavelength of 550 nm. To determine the retardation dispersion ($R_{0\text{-}450}/R_{0\text{-}550}$) the retardation is also measured at a wavelength of 450 nm and at an angle of 0°. Each film is then placed in an oven at 85° C. for a total time of 137 h. After 24 h and 137 h, the films are taken out of the oven, cooled to room temperature and the retardation profiles are measured again. The durability is quantified by the difference in $R_0$ and $R_{0\text{-}450}/R_{0\text{-}550}$ before and after the oven test. The results are summarized in the following tables 7 and 8:

TABLE 7

Durability Data $R_0$

| No. | Mixture | $R_0$ 0 h | $R_0$ 24 h | $R_0$ 137 h | $\Delta R_0$ 24 h [%] | $\Delta R_0$ 137 h [%] |
|---|---|---|---|---|---|---|
| CM 16* | H-2 + 1% Irgacure ® 819 | 150.1 | 161.6 | 162.7 | 7.7 | 8.4 |
| CM 17* | H-2 + 1% Darocure TPO | 154.0 | 165.8 | 166.3 | 7.7 | 8.0 |
| CM 18* | H-2 + 1% Irgacure ® 651 | 148.4 | 158.5 | 158.8 | 6.8 | 7.0 |
| CM 19* | H-2 + 1% Irgacure ® 369 | 157.9 | 170.4 | 169.8 | 7.9 | 7.5 |
| CM 20* | H-2 + 1% Irgacure ® 907 | 159.4 | 175.2 | 175.2 | 9.9 | 9.9 |
| M 9** | H-2 + 1% Oxe02 | 142.0 | 144.6 | 145.1 | 1.8 | 2.2 |

*Comparative example, photoinitiators all available from Ciba AG, Basel, Switzerland.
**Working example with compound of formula CO-17 (Oxe02, commercially available from Ciba AG, Basel, Switzerland).

TABLE 8

Durability Data $R_{0\text{-}450}/R_{0\text{-}550}$

| No. | Mixture | $R_{0\text{-}450}/R_{0\text{-}550}$ 0 h | $R_{0\text{-}450}/R_{0\text{-}550}$ 24 h | $R_{0\text{-}450}/R_{0\text{-}550}$ 137 h | $\Delta R_{0\text{-}450}/R_{0\text{-}550}$ 24 h [%] | $\Delta R_{0\text{-}450}/R_{0\text{-}550}$ 137 h [%] |
|---|---|---|---|---|---|---|
| CM 16* | H-2 + 1% Irgacure ® 819 | 0.886 | 0.932 | 0.938 | 5.2 | 5.9 |
| CM 17* | H-2 + 1% Darocure TPO | 0.887 | 0.934 | 0.937 | 5.3 | 5.6 |
| CM 18* | H-2 + 1% Irgacure ® 651 | 0.885 | 0.927 | 0.931 | 4.7 | 5.2 |
| CM 19* | H-2 + 1% Irgacure ® 369 | 0.896 | 0.935 | 0.938 | 4.4 | 4.7 |
| CM 20* | H-2 + 1% Irgacure ® 907 | 0.894 | 0.948 | 0.949 | 6.0 | 6.2 |
| M 9** | H-2 + 1% Oxe02 | 0.896 | 0.912 | 0.915 | 1.8 | 2.1 |

*Comparative example, photoinitiators all available from Ciba AG, Basel, Switzerland.
**Working example with compound of formula CO-17 (Oxe02, commercially available from Ciba AG, Basel, Switzerland).

In contrast to the comparative example of CM 16 to CM 20, the example of M9 in accordance with the present invention shows a significantly increased durability with respect to both, the change in $R_0$ and $R_{0-450}/R_{0-550}$.

Example 10

From each test mixture of example 9 (CM16 to CM20 and M9) a 33.3% solution of each test mixture in Toluene/Cyclohexane (7:3) is prepared. The material is spin coated on a glass substrate, which is covered with a rubbed polyimide alignment layer with 1500 rpm for 30 sec at 20° C. The coated films are annealed at an elevated temperature of 68° C. for 1 minute and cooled down to room temperature under a $N_2$-atmosphere. The annealed film is then cured with UV light ranging from 250 to 450 nm under a $N_2$-atmosphere (80 mW for 60 s).

All polymer films exhibit a uniform planar alignment, while being checked between crossed polarizers.

To measure the retardation ($R_0$) of each polymer film, a Carys-eclipse ellipsometer is used. The retardation is analysed at angle of 0° using a light source with a wavelength of 550 nm. To determine the retardation dispersion ($R_{0-450}/R_{0-550}$) the retardation is also measured at a wavelength of 450 nm and at an angle of 0°. Each film is then placed in an oven at 85° C. for a total time of 137 h. After 24 h and 137 h, the films are taken out of the oven, cooled to room temperature and the retardation profiles are measured again. The durability is quantified by the difference in $R_0$ and $R_{0-450}/R_{0-550}$ before and after the oven test. The results are summarized in the following tables 9 and 10:

TABLE 9

Durability Data $R_0$

| No. | Mixture | $R_0$ 0 h | $R_0$ 24 h | $R_0$ 137 h | $\Delta R_0$ 24 h [%] | $\Delta R_0$ 137 h [%] |
|---|---|---|---|---|---|---|
| CM 16* | H-2 + 1% Irgacure ® 819 | 147 | 157.1 | 158 | 6.9 | 7.5 |
| CM 17* | H-2 + 1% Darocure TPO | 151.1 | 162.2 | 162.9 | 7.3 | 7.8 |
| CM 18* | H-2 + 1% Irgacure ® 651 | 147 | 155.6 | 156.6 | 5.9 | 6.5 |
| CM 19* | H-2 + 1% Irgacure ® 369 | 150.7 | 158.7 | 159.5 | 5.3 | 5.8 |
| CM 20* | H-2 + 1% Irgacure ® 907 | 149 | 157.3 | 157.8 | 5.6 | 5.9 |
| M 9** | H-2 + 1% Oxe02 | 143.7 | 146.6 | 147.3 | 2.0 | 2.5 |

TABLE 10

Durability Data $R_{0-450}/R_{0-550}$

| No. | Mixture | $R_{0-450}/R_{0-550}$ 0 h | $R_{0-450}/R_{0-550}$ 24 h | $R_{0-450}/R_{0-550}$ 137 h | $\Delta R_{0-450}/R_{0-550}$ 24 h [%] | $\Delta R_{0-450}/R_{0-550}$ 137 h [%] |
|---|---|---|---|---|---|---|
| CM 16* | H-2 + 1% Irgacure ® 819 | 0.89 | 0.933 | 0.937 | 4.8 | 5.3 |
| CM 17* | H-2 + 1% Darocure TPO | 0.895 | 0.934 | 0.937 | 4.4 | 4.7 |
| CM 18* | H-2 + 1% Irgacure ® 651 | 0.889 | 0.923 | 0.93 | 3.8 | 4.6 |
| CM 19* | H-2 + 1% Irgacure ® 369 | 0.897 | 0.929 | 0.932 | 3.6 | 3.9 |
| CM 20* | H-2 + 1% Irgacure ® 907 | 0.897 | 0.931 | 0.933 | 3.8 | 4.0 |
| M 8** | H-2 + 1% Oxe02 | 0.895 | 0.911 | 0.916 | 1.8 | 2.3 |

*Comparative example, photoinitiators all available from Ciba AG, Basel, Switzerland.
**Working example with compound of formula CO-17 (Oxe02, commercially available from Ciba AG, Basel, Switzerland).

In contrast to the comparative example of CM16 to CM20, the example of M8 in accordance with the present invention shows a significantly increased durability with respect to both, the change in $R_0$ and $R_{0-450}/R_{0-550}$.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding European Application No. 16169931.9, filed May 17, 2016 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A polymerisable LC material comprising:
   at least one di- or multireactive mesogenic compound selected from the group of compounds of formula I,

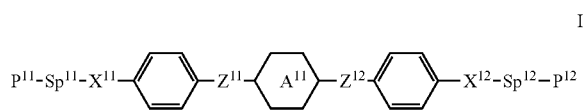

I wherein
$A^{11}$ denotes

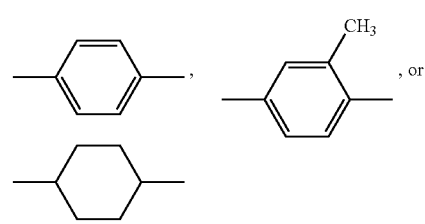

$P^{11}$ and $P^{12}$ each denote, independently from one another, a polymerisable group, Sp$^{11}$ and Sp$^{12}$ each denote, independently from one another, a spacer group or a single bond, X$^{11}$ and X$^{12}$ each denote, independently from one another, —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^{xx}$—, —CY$^{xx}$=CY$^{yy}$—, —C≡C—, —CH=CH—COO—, —OCO—CH=CH— or a single bond, R$^{xx}$ and R$^{yy}$ each, independently of one another, denote H or alkyl having 1 to 12 C atoms, and Y$^{xx}$ and Y$^{yy}$ each, independently of one another, denote H, F, Cl or CN, and Z$^{11}$ and Z$^{12}$ each denote, independently from one another, —COO—, —OOC—, —OCOO—, —OOCO—, or a single bond;

at least one monoreactive mesogenic compound selected from the group of compounds of formula II,

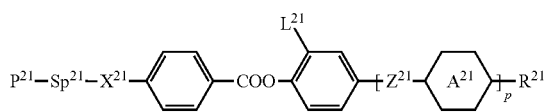

II wherein
A$^{21}$ denotes

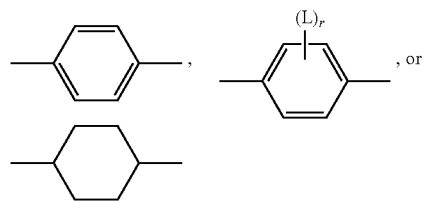

, or r is in each occurrence independently from another an integer from 1 to 4,

L denotes F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, L$^{21}$ denotes H, F, Cl, CN, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, p denotes 0, 1 or 2, P$^{21}$ denotes a polymerisable group, R$^{21}$ is H, alkyl, alkoxy, thioalkyl, alkylcarbonyl, alkoxycarbonyl, alkylcarbonyloxy or alkoxycarbonyloxy with 1 to 10 C atoms or more, or is Y Y is F, Cl, CN, NO$_2$, OCN, SCN, or mono- oligo- or polyfluorinated alkyl or alkoxy with 1 to 4 C atoms, Sp$^{21}$ denotes a spacer group or a single bond, X$^{21}$ denotes each and independently from another —O—, —S—, —CO—, —COO—, —OCO—, —O—COO—, —CO—NR$^{xx}$—, —NR$^{xx}$—CO—, —NR$^{xx}$—CO—NR$^{yy}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH—CR$^{xx}$—, —CY$^{xx}$=CY$^{yy}$—, —C≡C—, —CH=CH—COO—, —OCO—CH=CH— or a single bond, R$^{xx}$ and R$^{yy}$ each, independently of one another, denote H or alkyl having 1 to 12 C atoms, Y$^{xx}$ and Y$^{yy}$ each, independently of one another, denote H, F, Cl or CN, Z$^{21}$ is —C≡C—, —COO—, —OOC—, —OCOO—, —OOCO—, or a single bond;

at least one carbazole oxime ester photoinitiator; and one or more compounds of formula ND,

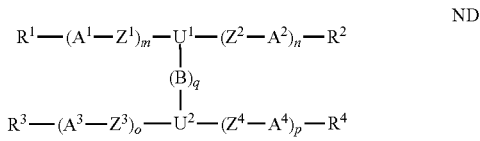

ND wherein
U$^{1,2}$ are independently of each other selected from

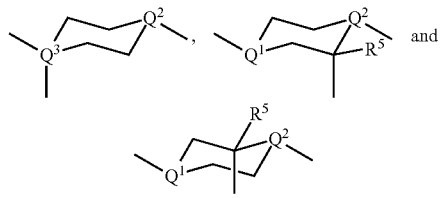

and including their mirror images, wherein the rings U$^1$ and U$^2$ are each bonded to the group —(B)$_q$— via the axial bond, and one or two non-adjacent CH$_2$ groups in these rings are optionally replaced by O and/or S, and the rings U$^1$ and U$^2$ are optionally substituted by one or more groups L, Q$^{1,2}$ are independently of each other CH or SiH, Q$^3$ is C or Si, B is in each occurrence independently of one another —C≡C—, —CY$^1$=CY$^2$— or an optionally substituted aromatic or heteroaromatic group, Y$^{1,2}$ are independently of each other H, F, Cl, CN or R$^0$, q is an integer from 1 to 10, A$^{1-4}$ are independently of each other selected from non-aromatic, aromatic or heteroaromatic carbocyclic or heterocyclic groups, which are optionally substituted by one or more groups R$^5$, and wherein each of -(A$^1$-Z$^1$)$_m$—U$^1$—(Z$^2$-A$^2$)$_n$- and -(A$^3$-Z$^3$)$_o$—U$^2$—(Z$^4$-A$^4$)$_p$- does not contain more aromatic groups than non-aromatic groups, Z$^{1-4}$ are independently of each other —O—, —S—, —CO—, —COO—, —OCO—, —O—COO—, —CO—NR$^0$—, —NR$^0$—CO—, —NR$^0$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^O$—, —C≡C—, —CH=CH—COO—, —OCO—CH=CH—, CR$^O$R$^{OO}$ or a single bond, R$^O$ and R$^{OO}$ are independently of each other H or alkyl with 1 to 12 C-atoms, m and n are independently of each other 0, 1, 2, 3 or 4, o and p are independently of each other 0, 1, 2, 3 or 4, R$^{1-5}$ are independently of each other identical or different groups selected from H, halogen, —CN, —NC, —NCO, —NCS, —OCN, —SCN, —C(=O)NR$^O$R$^{OO}$, —C(=O)X$^O$, —C(=O)R$^O$, —NH$_2$, —NR$^O$R$^{OO}$, —SH, —SR$^O$, —SO$_3$H, —SO$_2$R$^O$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group R$^{1-5}$ denoting or being substituted by P or P-Sp-, P is a polymerisable group, Sp is a spacer group or a single bond.

2. The polymerisable LC material according to claim 1, wherein at least one di- or multireactive mesogenic compound of formula I is selected from the group of compounds of formulae I-1 to I-3

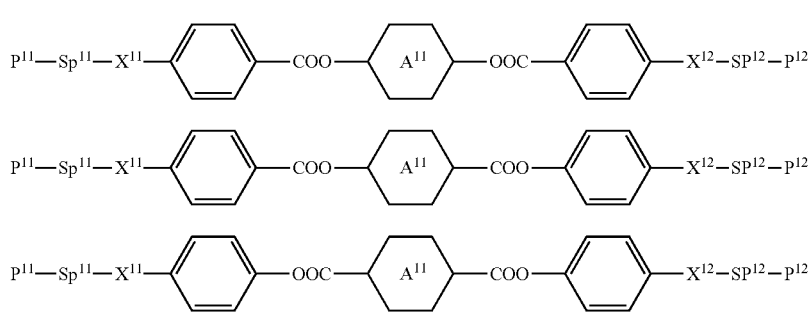

wherein
A$^{11}$, P$^{11}$ and P$^{12}$, Sp$^{11}$ and Sp$^{12}$, and X$^{11}$ and X$^{12}$ have one of the meanings as given in claim 1.

3. The polymerisable LC material according to claim 1, wherein at least one direactive mesogenic compound of formula I is selected from the group of compounds of the following formulae,

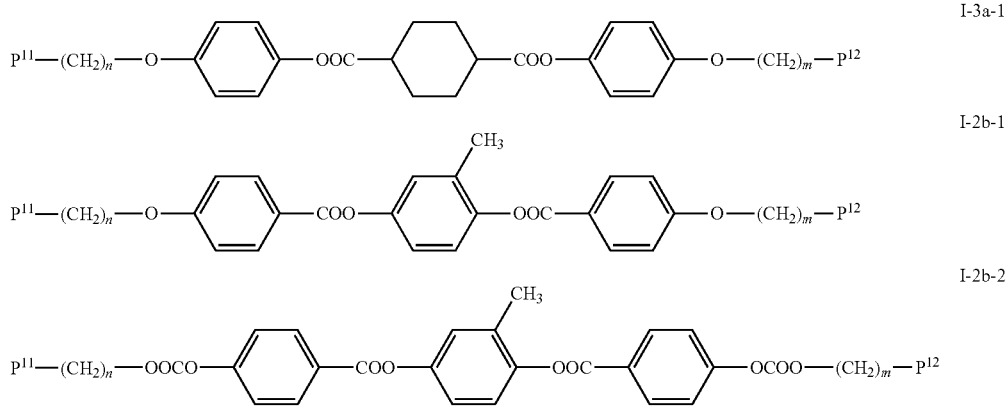

wherein
P$^{11}$ and P$^{12}$ have one of the meanings as given above in claim 1,
n and m denote are each and independently an integer from 1 to 12.

4. The polymerisable LC material according to claim 1, wherein at least one monoreactive mesogenic compound of formula II is selected from the group of compounds of formulae II-1 to II-5,

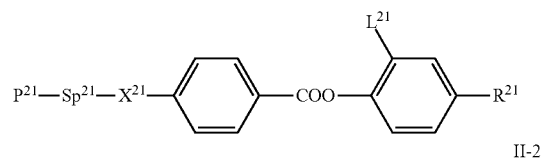

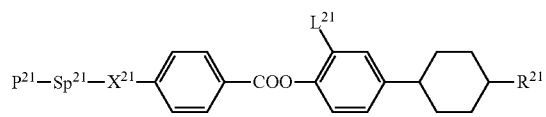

-continued

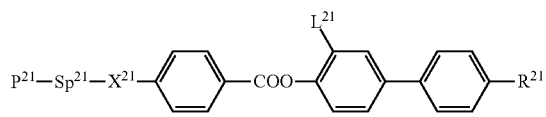

II-4
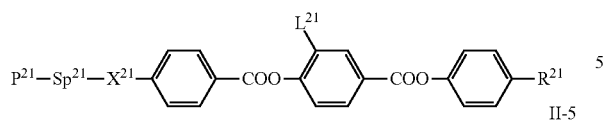
II-5
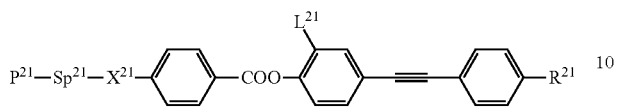
wherein, $P^{21}$, $Sp^{21}$, $X^{21}$, $L^{21}$ and $R^{21}$ have one of the meanings as given above in claim 1.
5. The polymerisable LC material according to claim 1, wherein at least one monoreactive mesogenic compound of formula II is selected from the group of compounds of the following formulae,
II-1a-1
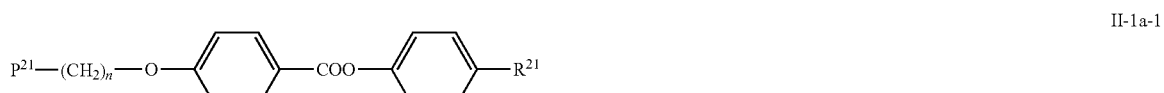
II-2a-1
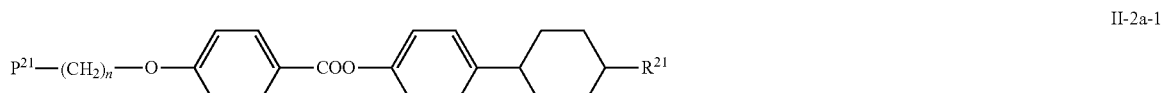
II-3a-1
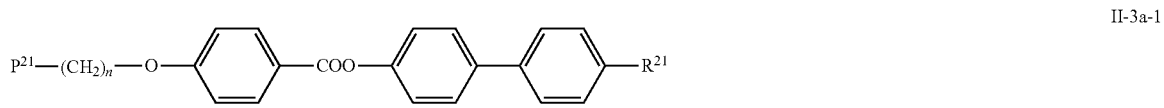
II-4a-1
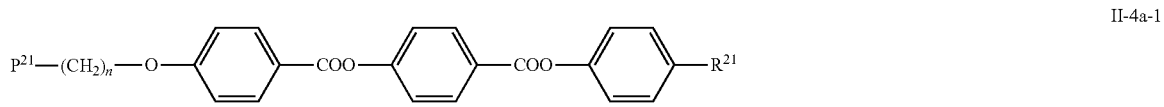
II-4a-2
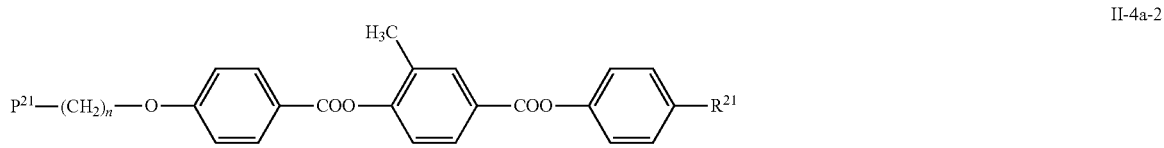
II-4a-3
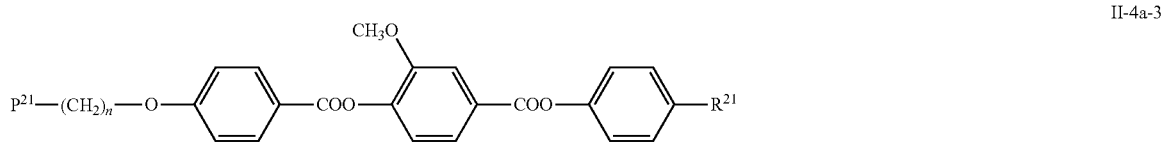
II-4a-4
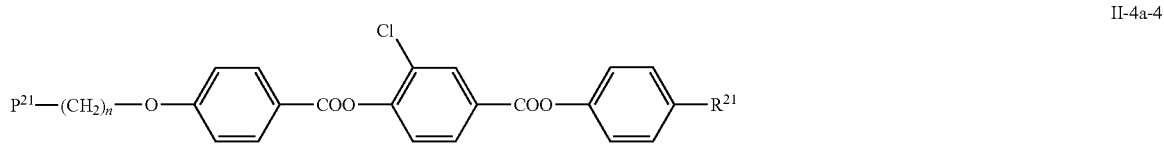
II-4a-5
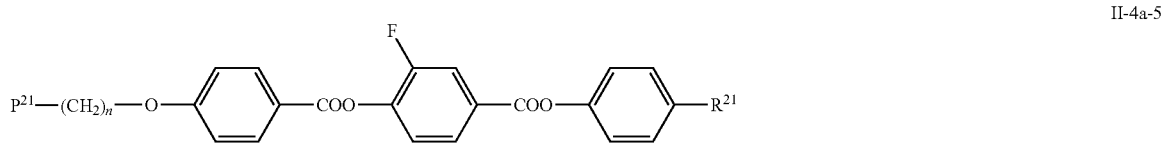
II-5a-1
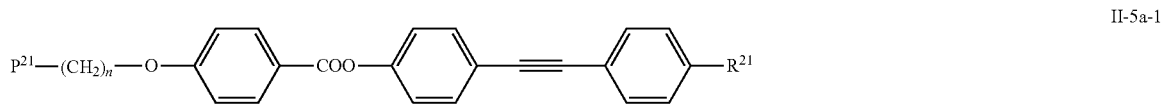
II-5a-2
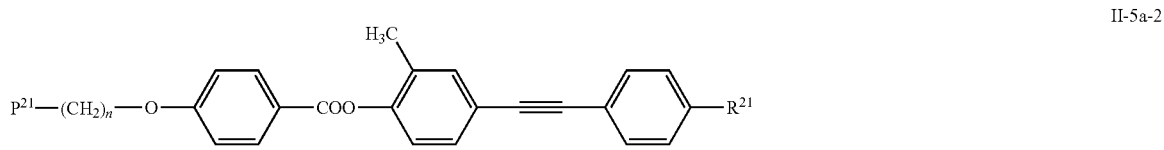

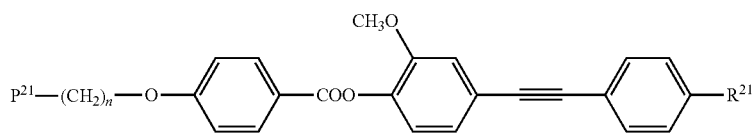

II-5a-3

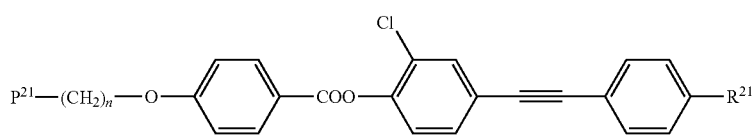

II-5a-4

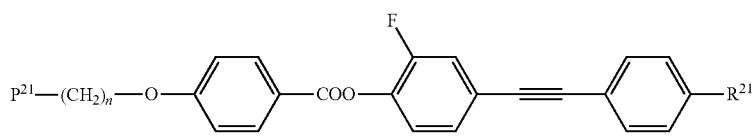

II-5a-5 wherein $P^{21}$ and $R^{21}$ have one of the meanings as given above in claim 1, and n denotes an integer from 1 to 12.

6. The polymerisable LC material according to claim 1, wherein the proportion of monoreactive polymerizable mesogenic compounds of formula II is in the range from 10 to 80% by weight.

7. The polymerisable LC material according to claim 1, wherein the proportion of direactive polymerizable mesogenic compounds of formula I is in the range from 20 to 80% by weight.

8. The polymerisable LC material according to claim 1, wherein the carbazole oxime ester photoinitiator is selected from the group of compounds of formula CO-1,

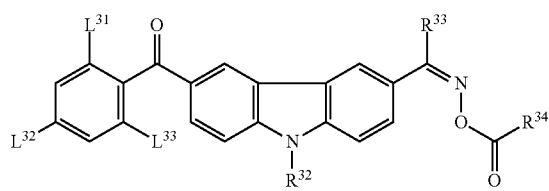

CO-1 wherein $L^{31}$ to $L^{33}$ each, independently of one another, denote H; alkyl, alkoxy, thioalkyl, alkylcarbonyl, alkoxycarbonyl, alkylcarbonyloxy or alkoxycarbonyloxy with 1 to 5 C atoms more; F; Cl; CN; $NO_2$; OCN; SCN; mono-, oligo- or polyfluorinated alkyl or alkoxy with 1 to 4 C atoms; or —($X^{31}$-$Sp^{31}$-$A^{31}$), $X^{31}$ denotes —O—, —S— —CO—, —COO—, —OCO—, —O—COO—, —CO—$NR^{xx}$—, —$NR^{xx}$—CO—, —$NR^{xx}$—CO—$NR^{yy}$— or a single bond, $R^{xx}$ and $R^{yy}$ each, independently of one another, denote H or alkyl having 1 to 12 C atoms, $Sp^{31}$ each, independently of one another, denotes a spacer group or a single bond, $A^{31}$ each, independently of one another, denotes an aryl, heteroaryl, (non-aromatic) alicyclic and heterocyclic group, optionally having one or more substituents, which are selected from silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups, and $R^{32}$ to $R^{34}$ each, independently of one another, denote H or alkyl having 1 to 12 C atoms.

9. The polymerisable LC material according to claim 1, further comprising one or more antioxidants.

10. The polymerisable LC material according to claim 1, further comprising one or more photoinitiators, which are not a carbazole oxime ester photoinitiator.

11. The polymerisable LC material according to claim 1, further comprising one or more additives selected from the group consisting of: surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and nanoparticles.

12. A process for the preparation of the polymerisable LC material according to claim 1 comprising mixing at least one di- or multireactive mesogenic compound of formula I and at least one monoreactive mesogenic compound of formula II, with at least one carbazole oxime ester photoinitiator and at least one compound of formula ND.

13. A process for the preparation of a polymer film comprising:

providing a layer of a polymerisable LC material according to claim 1 onto a substrate, polymerising the polymerisable LC material, and optionally removing the polymerised LC material from the substrate and/or optionally providing it onto another substrate.

14. A polymer film obtained from a polymerisable LC material according to claim 1 by a process comprising:

providing a layer of the polymerisable LC material onto a substrate, polymerising the LC material, and optionally, removing the polymerised LC material from the substrate and/or optionally providing it onto another substrate.

15. A polymer film according to claim 14, wherein the LC material in the polymer film is uniformly aligned.

16. An optical, electro optical, information storage, decorative or security item, in the form of a liquid crystal display, 3D display, projection system, polariser, compensator, alignment layer, circular polariser, colour filter, decorative image, liquid crystal pigment, reflective film with spatially varying reflection colours, multicolour image, non-forgeable document, identity card, credit card or banknote, which comprises a polymer film according to claim 14.

17. An optical, electro optical, information storage, decorative or security item, in the form of a liquid crystal display, 3D display, projection system, polariser, compensator, alignment layer, circular polariser, colour filter, decorative image, liquid crystal pigment, reflective film with spatially varying reflection colours, multicolour image, non-forgeable document, identity card, credit card or banknote, which comprises a polymerisable LC material according to claim 1.

18. An optical component or device, polariser, patterned retarder, compensator, alignment layer, circular polariser, colour filter, decorative image, liquid crystal lens, liquid crystal pigment, reflective film with spatially varying reflection colours, or multicolour image for decorative or information storage, comprising at least one polymer film according to claim 14.

19. An optical component or device, polariser, patterned retarder, compensator, alignment layer, circular polariser, colour filter, decorative image, liquid crystal lens, liquid crystal pigment, reflective film with spatially varying reflection colours, or multicolour image for decorative or information storage, comprising at least one polymerisable LC material according to claim 1.

20. The polymerisable LC material according to claim 2, wherein at least one monoreactive mesogenic compound of formula II is selected from the group of compounds of formulae II-1 to II-5,

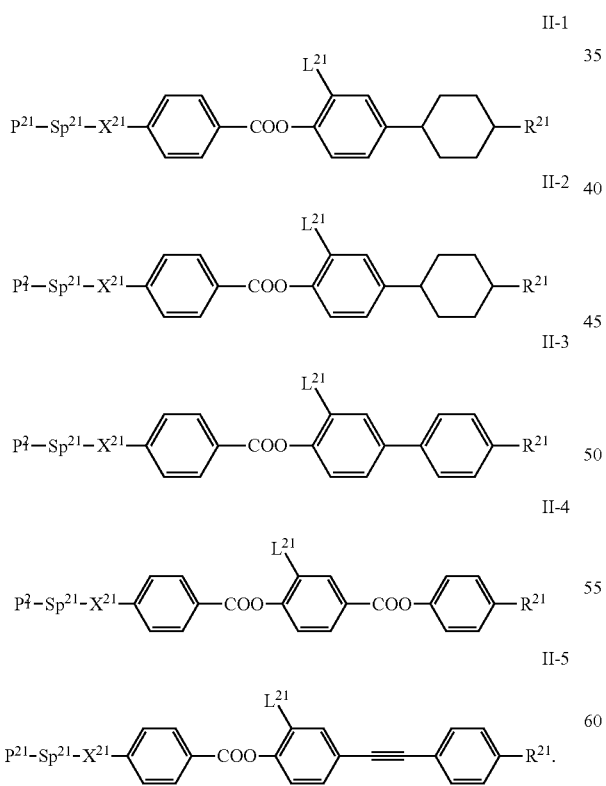

21. The polymerisable LC material according to claim 20, wherein the carbazole oxime ester photoinitiator is selected from the group of compounds of formula CO-1,

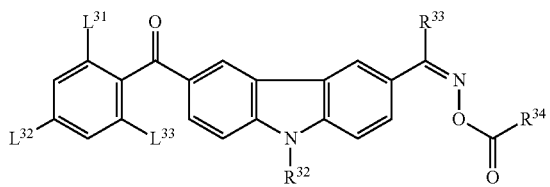

wherein $L^{31}$ to $L^{33}$ each, independently of one another, denote H; alkyl, alkoxy, thioalkyl, alkylcarbonyl, alkoxycarbonyl, alkylcarbonyloxy or alkoxycarbonyloxy with 1 to 5 C atoms more; F; Cl; CN; $NO_2$; OCN; SCN; mono-, oligo- or polyfluorinated alkyl or alkoxy with 1 to 4 C atoms; or —$(X^{31}$-$Sp^{31}$-$A^{31})$, $X^{31}$ denotes —O—, —S— —CO—, —COO—, —OCO—, —O—COO—, —CO—$NR^{xx}$—, —$NR^{xx}$—CO—, —$NR^{xx}$—CO—$NR^{yy}$— or a single bond-, $R^{xx}$ and $R^{yy}$ each, independently of one another, denote H or alkyl having 1 to 12 C atoms, $Sp^{31}$ each, independently of one another, denotes a spacer group or a single bond, $A^{31}$ each, independently of one another, denotes an aryl, heteroaryl, (non-aromatic) alicyclic and heterocyclic group, optionally having one or more substituents, which are selected from silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups, and $R^{32}$ to $R^{34}$ each, independently of one another, denote H or alkyl having 1 to 12 C atoms.

22. The polymerisable LC material according to claim 1, wherein, in formulae, I, II and ND:

$P^{11}$, $P^{12}$, $P^{21}$ and P each denote, independently from one another, a polymerisable group selected from the group consisting of $CH_2$—$CW^1$—COO—,

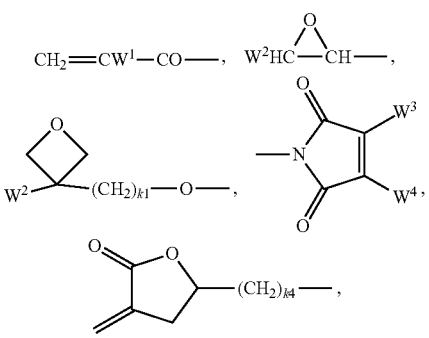

$CH_2$—$CW^2$—$(O)_{k3}$—, $CW^1$=CH—CO—$(O)_{k3}$—, $CW^1$—CH—CO—NH—, $CH_2$—$CW^1$—CO—NH—, $CH_3$—CH=CH—O—, $(CH_2$=$CH)_2$CH—OCO—, $(CH_2$=CH—$CH_2)_2$CH—OCO—, $(CH_2$=$CH)_2$CH—O—, $(CH_2$=CH—$CH_2)_2$N—, $(CH_2$=CH—$CH_2)_2$N—CO—, $CH_2$—$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, or Phe-CH=CH—, in which $W^1$ denotes H, F, Cl, CN, $CF_3$, phenyl or alkyl having 1 to 5 C atoms, $W^2$ denotes H or alkyl having 1 to 5 C atoms, $W^3$ and $W^4$ each, independently of one another, denote H, Cl or alkyl having 1 to 5 C atoms, Phe denotes 1,4-phenylene, which is optionally substituted by one or more radicals L but being different from P-Sp, $k_1$, $k_2$ and $k_3$ each, independently of one another, denote 0 or 1, and $k_4$ is an integer from 1 to 10.

23. The polymerisable LC material according to claim 1, wherein, in formula ND:

B is —C≡C—, —CH═CH—, —CY$^1$═CY$^2$—, —CH═N—, —N═CH—, —N═N— or —CH═CR$^0$—, or is 1,4-phenylene, naphthalene-2,6-diyl, indane-2,6-diyl or thieno[3,2-b]thiophene-2,5-diyl each optionally substituted with one or more groups L;

$A^{1-4}$ each, independently of one another, denote trans-1,4-cyclohexylene or 1,4-phenylene that are optionally substituted with one or more groups L; and P each, independently of one another is selected from the group consisting of $CH_2$═$CW^1$—COO—, $CH_2$═$CW^1$—CO—,

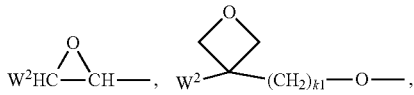

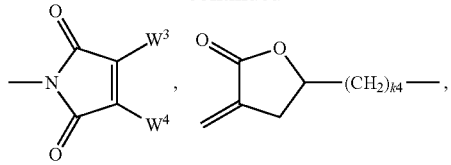

$CH_2$═$CW^2$—(O)$_{k3}$—, $CW^1$═CH—CO—(O)$_{k3}$—, $CW^1$═CH—CO—NH—, $CH_2$═$CW^1$—CO—NH—, $CH_3$—CH═CH—O—, $(CH_2$═CH$)_2$CH—OCO—, $(CH_2$═CH—$CH_2)_2$CH—OCO—, $(CH_2$═CH$)_2$CH—O—, $(CH_2$═CH—$CH_2)_2$N—, $(CH_2$═CH—$CH_2)_2$N—CO—, $CH_2$═$CW^1$—CO—NH—, $CH_2$═CH—(COO)$_{k1}$-Phe-(O)$_{k2}$—, $CH_2$═CH—(CO)$_{k1}$-Phe-(O)$_{k2}$—, or Phe-CH═CH—, in which $W^1$ denotes H, F, Cl, CN, $CF_3$, phenyl or alkyl having 1 to 5 C atoms, $W^2$ denotes H or alkyl having 1 to 5 C atoms, $W^3$ and $W^4$ each, independently of one another, denote H, Cl or alkyl having 1 to 5 C atoms, Phe denotes 1,4-phenylene, which is optionally substituted by one or more radicals L but being different from P-Sp, $k_1$, $k_2$ and $k_3$ each, independently of one another, denote 0 or 1, and $k_4$ is an integer from 1 to 10.

\* \* \* \* \*